(12) United States Patent
Sheppard

(10) Patent No.: US 12,189,583 B2
(45) Date of Patent: Jan. 7, 2025

(54) METHODS AND APPARATUS TO ESTIMATE CARDINALITY THROUGH ORDERED STATISTICS

(71) Applicant: The Nielsen Company (US), LLC, New York, NY (US)

(72) Inventor: Michael R. Sheppard, Holland, MI (US)

(73) Assignee: The Nielsen Company (US), LLC, New York, NY (US)

( * ) Notice: Subject to any disclaimer, the term of this patent is extended or adjusted under 35 U.S.C. 154(b) by 136 days.

(21) Appl. No.: 17/877,671

(22) Filed: Jul. 29, 2022

(65) Prior Publication Data

US 2023/0120709 A1    Apr. 20, 2023

Related U.S. Application Data

(60) Provisional application No. 63/256,341, filed on Oct. 15, 2021, provisional application No. 63/331,361, filed on Apr. 15, 2022.

(51) Int. Cl.
*G06F 16/21* (2019.01)

(52) U.S. Cl.
CPC .................... *G06F 16/21* (2019.01)

(58) Field of Classification Search
CPC .................. G06F 16/21; G06F 16/24545
USPC ......................................... 707/688
See application file for complete search history.

(56) References Cited

U.S. PATENT DOCUMENTS

| | | | |
|---|---|---|---|
| 2012/0095958 A1* | 4/2012 | Pereira | G06F 16/435 707/609 |
| 2017/0103417 A1 | 4/2017 | Nguyen et al. | |
| 2018/0189550 A1* | 7/2018 | McCombe | G06V 40/172 |
| 2021/0034665 A1* | 2/2021 | Cremer | G06F 16/683 |
| 2021/0248629 A1 | 8/2021 | Sullivan et al. | |
| 2021/0357403 A1 | 11/2021 | Dash | |
| 2021/0406240 A1 | 12/2021 | Sheppard et al. | |
| 2022/0036390 A1 | 2/2022 | Sheppard et al. | |
| 2023/0004997 A1 | 1/2023 | Sheppard et al. | |
| 2023/0120709 A1 | 4/2023 | Sheppard | |

OTHER PUBLICATIONS

Egert et al., "Privately Computing Set-Union and Set-Intersection Cardinality via Bloom Filters", Australasian Conference on Information Security and Privacy, 2015 (prepublication version accessed at https://www.cryptoplexity.informatik.tu-darmstadt.de/media/crypt/publications_1/ACISPegert2015.pdf).

Dao et al., "Minimizing Noise in HyperLogLog-Based Spread Estimation of Multiple Flows," 2022, 12 pages.

(Continued)

*Primary Examiner* — Kuen S Lu

(57) ABSTRACT

Methods, apparatus, systems, and articles of manufacture to estimate cardinality through ordered statistics are disclosed. In an example, an apparatus includes processor circuitry to selects a sample dataset from a first reference dataset of media assets and partitions the sample dataset into m mutually exclusive subsets of approximately equal size. The processor circuitry then estimates a ratio of a sample weighted average and empirical cumulative distribution of an approximately largest order statistic from at least one of the m subsets and generates an estimate of a total cardinality of the first reference dataset by multiplying the ratio by approximately m.

12 Claims, 8 Drawing Sheets

(56) References Cited

OTHER PUBLICATIONS

Flajolet et al., HyperLogLog: The Analysis of a near-optimal Cardinality Estimation Algorithm, 2007 Conference on Analysis of Algorithms, DMTCS proc. AH, 2007, pp. 127-146.
Goldberg, Lydia Koujianou, "Sketch-Based Cardinality Estimation Algorithms," Bachelor's thesis, Harvard College, 2018, 50 pages.
Xiao et al., "Hyper-Compact Virtual Estimators for Big Network Data Based on Register Sharing," SIGMETRICS, Jun. 2015, 12 pages.

* cited by examiner

METHODS AND APPARATUS TO ESTIMATE CARDINALITY THROUGH ORDERED STATISTICS

RELATED APPLICATION

This patent claims the benefit of U.S. Provisional Patent Application No. 63/256,341, which was filed on Oct. 15, 2021, and U.S. Provisional Patent Application No. 63/331,361, which was filed on Apr. 15, 2022. U.S. Provisional Patent Application No. 63/256,341 and U.S. Provisional Patent Application No. 63/331,361 are both hereby incorporated herein by reference in their entirety. Priority to both U.S. Provisional Patent Application No. 63/256,341 and U.S. Provisional Patent Application No. 63/331,361 is hereby claimed.

FIELD OF THE DISCLOSURE

This disclosure relates generally to computer processing and, more particularly, methods and apparatus to estimate cardinality through ordered statistics.

BACKGROUND

Broadcasters and Advertisers track user access to digital media determine viewership information for the digital media. Digital media can include Internet-accessible media.

Tracking viewership of digital media can present useful information to broadcasters and advertisers when determining placement strategies for digital advertising. The success of user/viewership tracking strategies is dependent on the accuracy that technology can achieve in generating audience metrics.

Figure 1:
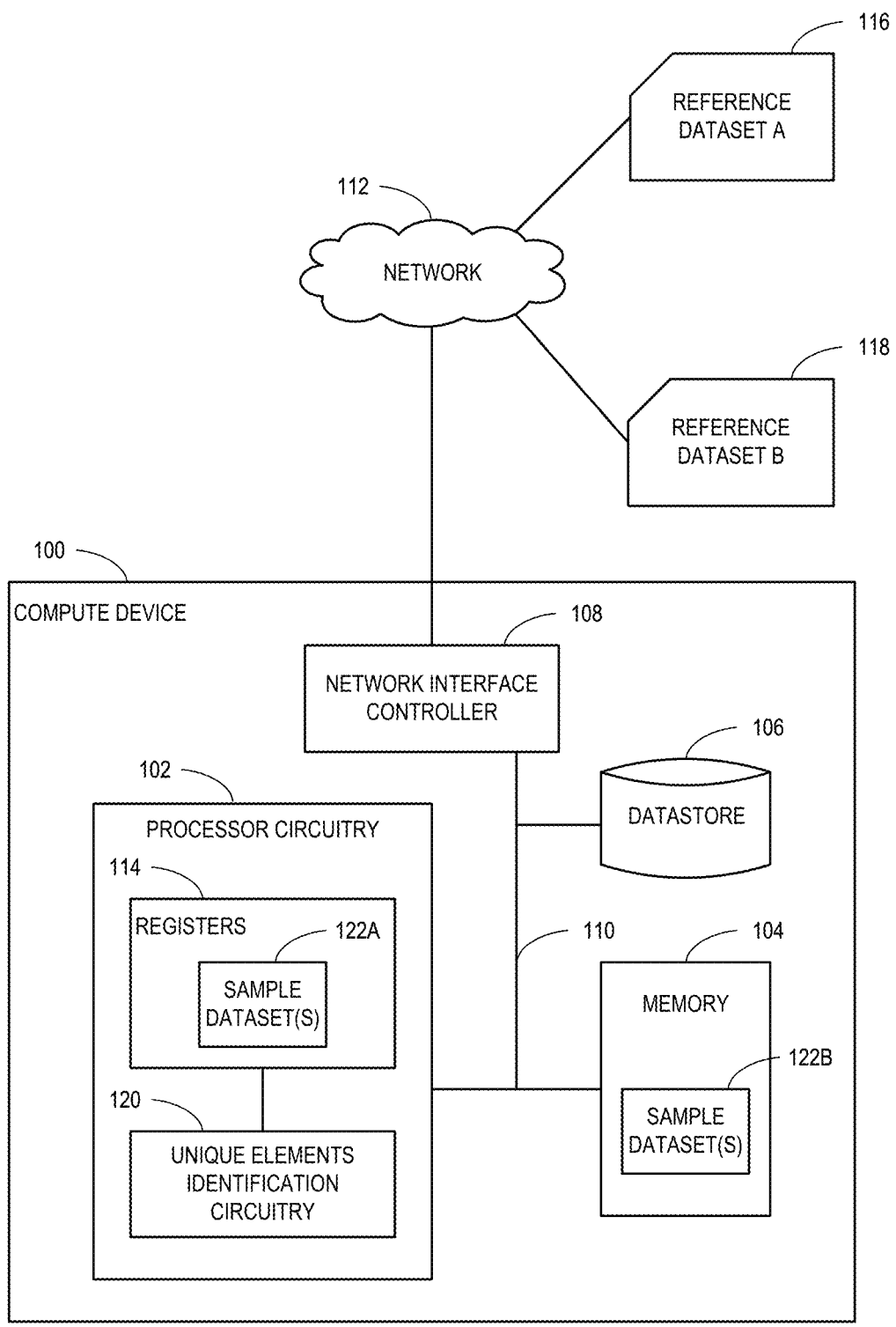
FIG. 1 illustrates an example system that estimates the cardinality of datasets through ordered statistics.

The figures are not to scale. In general, the same reference numbers will be used throughout the drawing(s) and accompanying written description to refer to the same or like parts. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other.

As used herein, "approximately" and "about" modify their subjects/values to recognize the potential presence of variations that occur in real world applications. For example, "approximately" and "about" may modify dimensions that may not be exact due to specific implementations of software programs and/or hardware architectural design for efficiency, expediency, and/or other purposes. For example, "approximately" and "about" may indicate such range of +/−10% of a relative value within a group of values, unless otherwise specified in the below description.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events. As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

As used herein, the term "media" includes any type of content and/or advertisement delivered via any type of distribution medium. Thus, media includes television programming or advertisements, radio programming or advertisements, podcasts, movies, web sites, streaming media, etc.

Example methods, apparatus, and articles of manufacture disclosed herein monitor media presentations at media devices. Such media devices may include, for example, Internet-enabled televisions, personal computers, Internet-enabled mobile handsets (e.g., a smartphone), video game consoles (e.g., Xbox®, PlayStation®), tablet computers (e.g., an iPad®), digital media players (e.g., a Roku® media player, a Slingbox®, etc.), etc.

In some examples, media monitoring information is aggregated to determine ownership and/or usage statistics of media devices, determine the media presented by the media devices, determine audience ratings, determine relative rankings of usage and/or ownership of media devices, determine types of uses of media devices (e.g., whether a device is used for browsing the Internet, streaming media from the Internet, etc.), and/or determine other types of media device information. In examples disclosed herein, monitoring information includes, but is not limited to, one or more of media identifying information (e.g., media-identifying metadata, codes, signatures, watermarks, and/or other information that may be used to identify presented media), application usage information (e.g., an identifier of an application, a time and/or duration of use of the application, a rating of the application, etc.), identifying information (e.g., demographic information, a user identifier, a panelist identifier, a username, etc.), etc.

Media monitoring entities (e.g., The Nielsen Company (US), LLC, etc.) desire knowledge regarding how users interact with media devices such as smartphones, tablets, laptops, smart televisions, etc. In some examples, media monitoring entities monitor media presentations made at the media devices to, among other things, monitor exposure to advertisements, determine advertisement effectiveness, determine user behavior, identify purchasing behavior associated with various demographics, etc.

Media monitoring entities can generate media reference databases that can include unhashed signatures, hashed signatures, and watermarks. These references are generated by a media monitoring entity (e.g., at a media monitoring station (MMS), etc.) by monitoring a media source feed, identifying any encoded watermarks and determining signatures associated with the media source feed. In some examples, the media monitoring entity can hash the determined signatures. Additionally or alternatively, the media monitoring entities generate reference signatures for downloaded reference media (e.g., from a streaming media provider), reference media transmitted to the media monitoring entity from one or more media providers, etc. As used herein, a "media asset" refers to any individual, collection, or portion/piece of media of interest (e.g., a commercial, a song, a movie, an episode of television show, etc.). Media assets can be identified via unique media identifiers (e.g., a name of the media asset, a metadata tag, etc.). Media assets can be presented by any type of media presentation method (e.g., via streaming, via live broadcast, from a physical medium, etc.). In some examples, the unique media identifiers used to identify the media asset are uniform in size (e.g., a unique 4096-bit value may correspond to a specific media asset and all media assets also each have their own 4096-bit value, deemed a reference media asset). In other examples, the sizes of the identifiers may vary.

The reference database can be compared (e.g., matched, etc.) to media monitoring data (e.g., watermarks, unhashed signatures, hashed signatures, etc.) gathered by media meter(s) to allow crediting of media exposure. Monitored media can be credited using one, or a combination, of watermarks, unhashed signatures, and hashed signatures. In some examples, media monitoring entities store generated media asset reference databases and gathered monitoring data on cloud storage services (e.g., AMAZON WEB SERVICES®, etc.). However, over time, the number of stored references to media assets (e.g., reference media assets) will continue to grow until the reference database includes the entire universe of media assets to match. In some examples, the reference database may include duplicate entries of reference media assets. In such examples, the media monitoring entities may determine the number of unique entries in the reference database for use in crediting media exposure, identifying viewership of media, etc. However, determining the exact number of unique entries in very large databases (e.g., the reference database) is computationally infeasible.

The HyperLogLog (HLL) is a well-known algorithm to determine a probabilistic estimate the number of distinct elements/entries (e.g., cardinality) in very large databases with minimal memory. In the HLL algorithm, a maximum value is determined in a dataset within a register based on the position of first leftmost '1'. A usage of the geometric distribution in HLL is a consequence of using the position of the leftmost 1 in the binary representation of the hashed data as the statistic of interest. For example:

rank=1: 1[other bits]–50% of the time
rank=2: 01[other bits]–25% of the time
rank=3: 001[other bits]–12.5% of the time The probability the rank is equal to k is $(\frac{1}{2})^k$, which is the geometric distribution. Within each register the largest rank is recorded.

Example techniques disclosed herein describe a general approach to estimating the number of distinct elements in a large dataset using maximum order and/or minimum-order statistics. Example techniques disclosed herein can readily be applied to different scenarios, such as change of number base (e.g., hexadecimal, etc.) to other quantities of interest. Additionally, example techniques disclosed herein are not restricted to a physical bit-representation but also apply to maximum and minimum data sketches of any statistic of interest, either discrete or continuous. In example techniques disclosed herein, the HLL is a special case of a more general class of estimators.

Example techniques disclosed herein can also use the minimum with appropriate changes, as detailed below in the MinSketch procedure. One property for sketches is that of mergeability. Some example techniques disclosed herein merge the sketches of two or more datasets to produce a new sketch which can be used to estimate the deduplicated cardinality of the overall merged datasets together.

In some examples, media monitoring entities may want to determine a number of unique entries in a dataset to determine statistics such as, a number of visitors to a website, a number of members in an audience, a number of unique individuals in a panel, etc. However, data included in the datasets may be hashed differently. For example, companies (e.g., Facebook, etc.) may provide random identifiers from hashing user data for privacy reasons. Example techniques disclosed herein can empirically estimate a number of unique entries in a dataset and can be generalized readily to any statistical distribution of interest (e.g., geometric, binomial, etc.). Example techniques disclosed herein can estimate a number of unique entries in a dataset by using the values of a set of registers used to track entries in the database and the base distribution of the statistic of interest (e.g., binary, hexadecimal, etc.). Example techniques disclosed herein determine a maximum number in each of the set of registers used to track the entries of the database to calculate the number of unique entries in the entire dataset of the database.

Example techniques disclosed herein describe a general methodology that can be used in any non-standard cardinality estimates. For example, example techniques disclosed herein can be used with a Hamming weight of the bit-string (instead of the HLL). In such an example, assuming a 64-bit array where the first 10 bits of a binary string representative of a given database entry are used to determine the particular register of the set of registers to which that entry of the database is to be assigned, and the remaining 54 bits of the binary string are used for some statistic, the Hamming weight for the binary string is known as the bit-sum, which under the assumption of a uniform hash, follows the binomial distribution (different from a geometric distribution used in the HLL). Example techniques disclosed herein determine the maximum value of the Hamming weight among the entries in each register, and the example techniques disclosed herein calculate an estimate of the number of unique entries among all of the registers using each of the maximum values and the based distribution of the database.

In ordered statistics, a largest ordered statistic in a dataset is a maximum of the dataset and a smallest ordered statistic in the dataset is a minimum of the dataset. In some examples, the same holds true for a sample of the dataset (e.g., a subset of the original dataset), where a largest ordered statistic in a sample is a maximum of the sample and a smallest ordered statistic in the sample is a minimum of the sample. Examples disclosed herein, describe a type of estimator for the order of such a sample when the samples are independent and identically distributed. As used herein, the terms "maximum order statistic" and "largest order statistic" have the same meaning and can be used interchangeably. As used herein, the terms "minimum order statistic," "first order statistic," and "smallest order statistic" have the same meaning and can be used interchangeably.

Examples disclosed herein apply the estimator of sample order to cardinality estimation (e.g., a count distinct problem). In examples disclosed herein, the cardinality estimator for the maximum of a sample is referred to as the MaxSketch estimator and the cardinality estimator for the minimum of a sample is referred to as the MinSketch estimator. In some examples, the MaxSketch estimator and the MinSketch estimator provide maximum and minimum summaries, respectively, used to estimate the cardinality of the sample. For example, the MaxSketch estimator may provide an estimate of the cardinality of a reference dataset of media assets and the MinSketch estimator may provide an estimate of the intersection cardinality of two reference datasets of media assets. In some examples, MaxSketch and MinSketch are two different procedures to estimate a numerical value yielding two different estimates, the MaxSketch procedure uses the maximum of a statistic of interest, whereas the MinSketch procedure other uses the minimum of a statistic of interest.

For example, if there are 10 registers (e.g., m=10), stochastic averaging may be assumed, which means each of the 10 registers will have approximately the same number of unique entries (n). In some examples, the actual number of entries in each register, including repeats, may vary register by register, but the number of unique values is measured. For example, assume 10 registers (m=10) are used to each determine a number of unique values and a dataset of 1,000,000 objects/values in length and there are 200 unique entries across them. In some examples, the 200 (N=200) unique entries are uniformly partitioned across the m registers, yielding about 20 (n=20) unique entries per register. If there are half a million entries of a first value, all with register 01 and the first value is the fifth ranked value (fifth largest value within register 01, e.g., rank=5), then, in some examples, none of the 500,000 values matter in the current scenario because only the maximum rank is observed for that register. In some examples, the usage of maximum (or minimum) do not change with repetitions. As such, an example cardinality estimation ignores any repeat values within a group of values that cardinality is to be determined (or estimated).

FIG. 1 illustrates an example system that estimates cardinality of datasets. In some examples, the cardinality estimate includes a total cardinality of a dataset. In some examples, the cardinality estimate includes an intersected cardinality between two or more datasets (e.g., the elements/items/objects/assets in each dataset that are common among all of the two or more datasets).

In the illustrated example of FIG. 1, a compute device 100 is present. The compute device 100 includes processor circuitry 102, memory 104, datastore 106, and network interface controller 108. The example compute device 100 may be a laptop computer, a desktop computer, a workstation, a phone, a tablet, an embedded computer, or any other type of computing device. In some examples, the compute device 100 may be a virtual machine running on a single physical computing device or a virtual machine running on portions of several computing devices across a distributed network or cloud infrastructure. In some examples, an interface 110 communicatively couples the processor circuitry 102, memory 104, datastore 106, and network interface controller 108. The interface 110 may be any type of one or more interconnects that enable data movement between the processor circuitry 102, memory 104, datastore 106, and network interface controller 108 within the compute device 100.

The example processor circuitry 102 may include portions or all of a general purpose central processing unit (CPU), a graphical processing unit (GPU), an application specific integrated circuit (ASIC), a field programmable gate array (FPGA), or any other type of processing logic capable of performing unique elements identification operations described below. The example memory 104 may store instructions to be executed by the processor circuitry 102 and/or one or more other circuitries within the compute device 100. In different examples, the memory 104 can be physical memory that could include volatile memory (e.g., dynamic random access memory (DRAM), static random access memory (SRAM), etc.) non-volatile memory, buffer memory within a processor, a cache memory, or any one or more other types of memory.

According to the illustrated example, the datastore 106 may be a single datastore included in the compute device 100 or it may be a distributed datastore, which may be implemented by any number and/or type(s) of datastores. The datastore 106 may be implemented by volatile memory, non-volatile memory, or one or more mass storage devices such as hard disk drive(s) (HDD(s)), compact disk (CD)

drive(s), digital versatile disk (DVD) drive(s), solid-state disk (SSD) drive(s), etc., or any other type of capable data storage technology. Furthermore, the data stored in the datastore 106 may be in any data format such as, for example, binary data, comma delimited data, tab delimited data, structured query language (SQL) structures, etc.

In the illustrated example, the network interface controller 108 may include one or more host controllers, one or more transceivers (e.g., transmission TX and receiving RX units), and/or one or more other circuitries capable of communicating across a network. The example network interface circuitry 108 includes one or more wireless network host controllers and/or transceivers to enable the compute device 100 to communicate (e.g., send/receive data packets) over a wireless network, such as network 112 (e.g., an IEEE 802.11-based wireless network, among others). For example, the network interface controller 108 may receive a data packet over a wireless network and provide the data from the data payload portion of the data packet to one or more circuitries within the compute device 100. In some examples, the network interface controller 108 includes one or more wired network host controllers and/or transceivers to enable the compute device 100 to communicate over a wired network, such as an Ethernet network or one or more other wired networks.

In the illustrated example of FIG. 1, the processor circuitry 102 includes a group (e.g., set) of registers 114. In some examples, the registers 114 may be physical registers implemented in hardware within the processor circuitry 102. In some examples, the registers 114 may be virtual registers implemented in software being executed by the processor circuitry 102. The example registers 114 may be of any length (e.g., 1024 bits, 4096 bits, etc.) and in any number (e.g., 512 registers, 1024 registers, 16384 registers, etc.).

According to the illustrated example, one or more reference datasets of reference media assets are accessible through the network 112 or elsewhere (e.g., reference dataset A 116 and reference dataset B 118). The example reference datasets A and B (116 and 118) include reference media assets data. In some examples, the reference media assets make up one or more of the reference datasets A and B (116 and 118). In some examples, additional data (e.g., additional monitoring information) is included in the one or more reference datasets A and B (116 and 118) beyond the reference media assets.

In some examples, reference datasets A and B (116 and 118) include aggregated reference media assets from diverse geographic regions captured in a wide range of time windows. Thus, in some examples, the reference datasets A and B (116 and 118) are very large and may be stored in large datastores accessible through the network 112. For example, one or more of the reference datasets A and B (116 and 118) may be too large to store in the compute device 100 memory 104 and/or local datastore 106. Additionally, in some examples, the reference datasets A and B (116 and 118) each may include a percentage of duplicate entries/elements/objects (e.g., reference dataset A 116 may have 20% duplicate entries). Also, in some examples, the reference datasets A and B (116 and 118) may include a percentage of overlapping entries/elements/objects across the two datasets (e.g., e.g., reference dataset A 116 and reference dataset B 118 may have 10% overlapping entries). As used herein, an "entry" in a dataset means a value that corresponds to a reference media asset.

According to the illustrated example in FIG. 1, the processor circuitry 102 includes a unique elements identification circuitry 120. The example unique elements identification circuitry 120 is described in greater detail with respect to the discussion of FIG. 2 below. In some examples, the unique elements identification circuitry 120 estimates a cardinality of a reference dataset (e.g., reference dataset A 116 and/or reference dataset B 118) by performing operations on a smaller sample dataset of reference media assets obtained from the reference dataset. As used herein, estimating a cardinality in a reference dataset means determining an estimated count of unique entries/elements/objects in the reference dataset.

In the illustrated example of FIG. 1, the unique elements identification circuitry 120 obtains one or more sample dataset(s) 122 (as shown in 122A and 122B, described below) from one or more of the reference datasets A and/or B (116 and/or 118) and causes the processor circuitry 102 to store the sample dataset(s) 122 in the memory 104.

Figure 2:
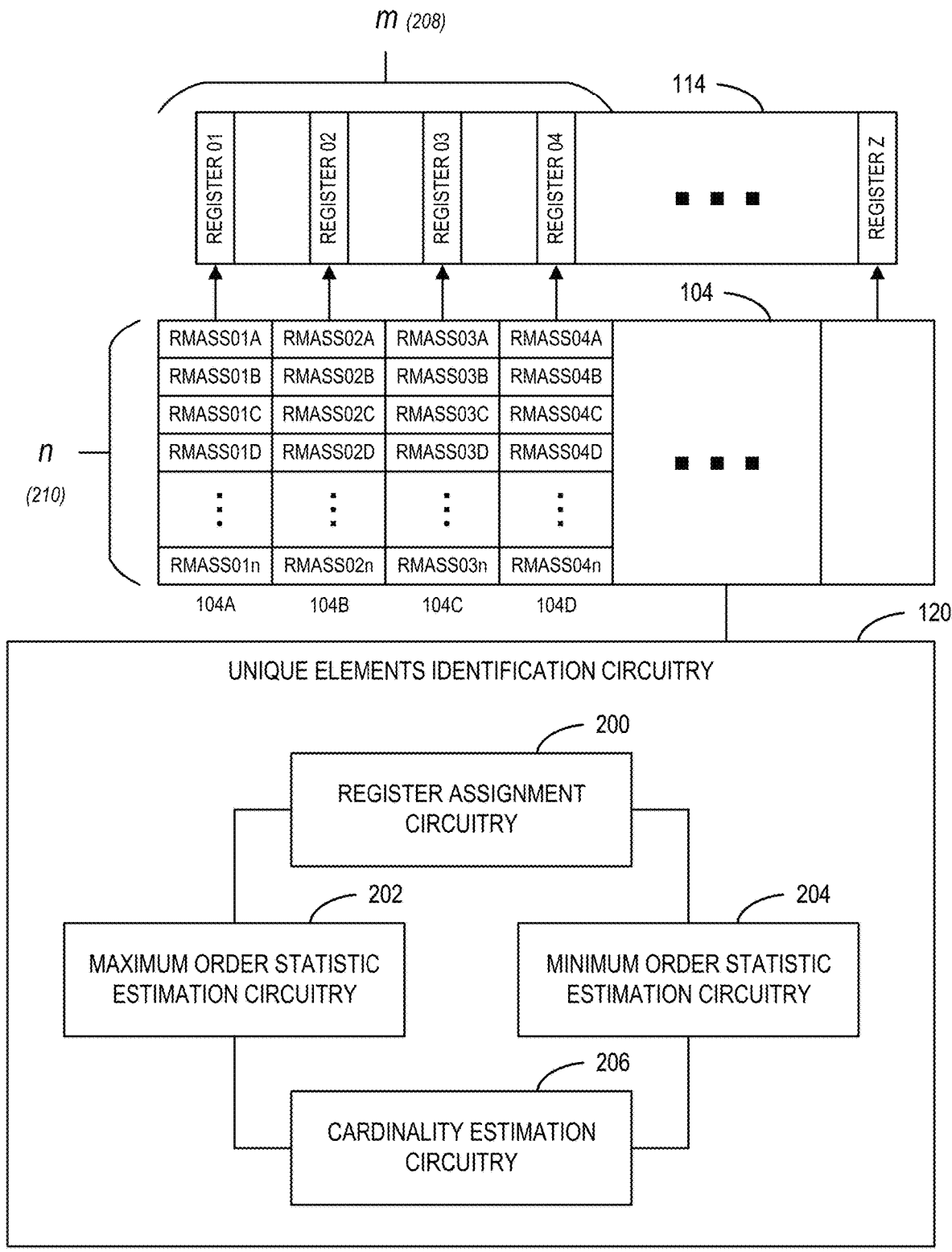
FIG. 2 is a block diagram of example unique elements identification circuitry to estimate cardinality through ordered statistics.

FIG. 2 is a block diagram of example unique elements identification circuitry 120 (FIG. 1) to estimate cardinality through ordered statistics. The example unique elements identification circuitry 120 includes example register assignment circuitry 200, example maximum order statistic estimation circuitry 202, example minimum order statistic estimation circuitry 204, and example cardinality estimation circuitry 206 to estimate cardinality through ordered statistics.

In the illustrated example of FIG. 2, the register assignment circuitry 200 selects (e.g., obtains, retrieves, etc.) a sample dataset 122 (FIG. 1) from a reference dataset (e.g., reference dataset A 116 in FIG. 1). In some examples, the sample dataset 122 includes a set (e.g., group) of samples of reference media assets. The example register assignment circuitry 200 transforms the data from a reference dataset into a representation (e.g., bit-strings, hexadecimal strings, or some hash mechanism). In some examples, the statistic of interest is some observable of that hash (e.g., the position of the leftmost one bit, or sum of bits, or some other combination). In some examples, the statistic of interest has some distribution (e.g., a sum of bits may be a binomial distribution, a position of leftmost 1 bit may be a geometric distribution). As used herein, the distribution that is present is referred to as the "base distribution," but does not need to be limited to a known distribution.

In some examples, each of the samples of reference media assets in the set are independent and identically distributed. For example, when the register assignment circuitry 200 obtains the sample dataset 122, a collection of random samples are included in the sample dataset 122 where each random sample has the same probability distribution as the other random samples and the collection of random samples all are mutually independent.

Once the sample dataset 122 has been selected, the example register assignment circuitry 200 partitions the selected sample dataset 122 in a number (e.g., represented by the variable "m") of mutually exclusive subsets. In some examples, the m (e.g., m number of) mutually exclusive subsets are of equal size. For example, if the sample dataset 122 includes 20000 samples (e.g., 20000 reference media assets), the register assignment circuitry 200 may partition the 20000 reference media assets into 200 subsets of 100 reference media assets each. In some examples, any combination of a number of mutually exclusive subsets of equal size may be used (e.g., for a 20000 count of samples in a sample dataset, the division may be 2000 subsets of 10 reference media assets each, 40 subsets of 500 reference media assets each, etc.). As used herein, "mutually exclusive subsets" means each subset of samples selected from the reference dataset includes all samples that are not selected more than once across the group of subsets.

For example, each register in the group of registers 114 uses 8-bits of memory, then such a register can record up to $2^8=256$ in value of the statistic of interest. In some examples, this recorded value may be in the position of the leftmost 1-bit, the sum of bits, or one or more other types of values to record. If, for example, there are 1,024 registers, each of 8-bits, then there are 1,024 values between 0 and 255. In some examples, that set of values may then used to estimate the cardinality of the reference database (e.g., potentially trillions of values).

In the illustrated example of FIG. 2, the register assignment circuitry 200 assigns each subset of samples (e.g., reference media asset (RMA) samples) to a register from the group of registers 114. As used herein, to "assign" a subset of samples to a register means to link the subset of samples to the register. For example, the register assignment circuitry 200 may cause storage of a subset of samples into a location in memory and then link that subset of samples to a specific register (e.g., for use). The example group of registers 114 (e.g., plurality of registers 114) may include a Z number of registers, including REGISTER 01, REGISTER 02, REGISTER 03, REGISTER 04, and so on up to REGISTER Z. For example, if the division of samples across subsets of media assets is 200 subsets of 100 reference media assets each, then each register is linked to a subset of 100 reference media assets and 200 registers will be used in total to store a maximum or minimum value from each of the 200 subsets (e.g., the statistic of interest).

As illustrated in the example in FIG. 2, the register assignment circuitry 200 assigns a sample dataset 122 (FIG. 1) from a reference dataset A 116 (FIG. 1) into memory 104. For example, the register assignment circuitry 200 separates the sample dataset 122 into m (208) subsets of samples (e.g., m (208) is 4 in the illustrated example). In some examples, there are n (210) RMA samples in each of the m (208) subsets. For example, to populate the memory 104 with the four subsets, the register assignment circuitry 200 populates a first set of memory locations (104A) in memory 104 with the first subset of samples and then assigns REGISTER 01 to be a working storage location for a maximum value or a minimum value representing the first subset. In some examples, the RMA sample subset (SS) 01 includes samples A, B, C, D, and up through n (210), or more specifically, RMASS01A, RMASS01B, RMASS01C, RMASS01D, through RMASS01n. The example register assignment circuitry 200 populates a second set of memory locations (104B) in memory 104 with the second subset of samples and then assigns REGISTER 02 to be a working storage location for a maximum value or a minimum value representing the second subset. In some examples, the RMA sample subset 2 (RMASS02) includes RMASS02A, RMASS02B, RMASS02C, RMASS02D, through RMASS02n. The example register assignment circuitry 200 continues the same process to populate memory locations 104C and 104D with subsets 3 and 4, respectively and assigns subset 3 to REGISTER 03 and subset 4 to REGISTER 4.

As used herein, X is a base distribution (a known or unknown distribution/representation) that a reference dataset (e.g., reference dataset A 116 in FIG. 1) is transformed into. In some examples, X includes a cumulative function F(x). In some examples, reference media assets from the reference dataset A 116 are represented as ordered statistics by variables $X_1, \ldots, X_n$ and are arranged in order of magnitude (e.g., the order of the numerical values represented by $X_1, \ldots, X_n$) and written as $X_{(1)} \leq \ldots \leq X_{(n)}$, then $X_{(i)}$ is the ith reference media asset order statistic (i=1, ..., n). Thus, in some examples, the first reference media asset order statistic, or minimum reference media asset, is $X_{(1)}$ and the nth media asset order statistic, or maximum media asset, is X(n).

Figure 3:
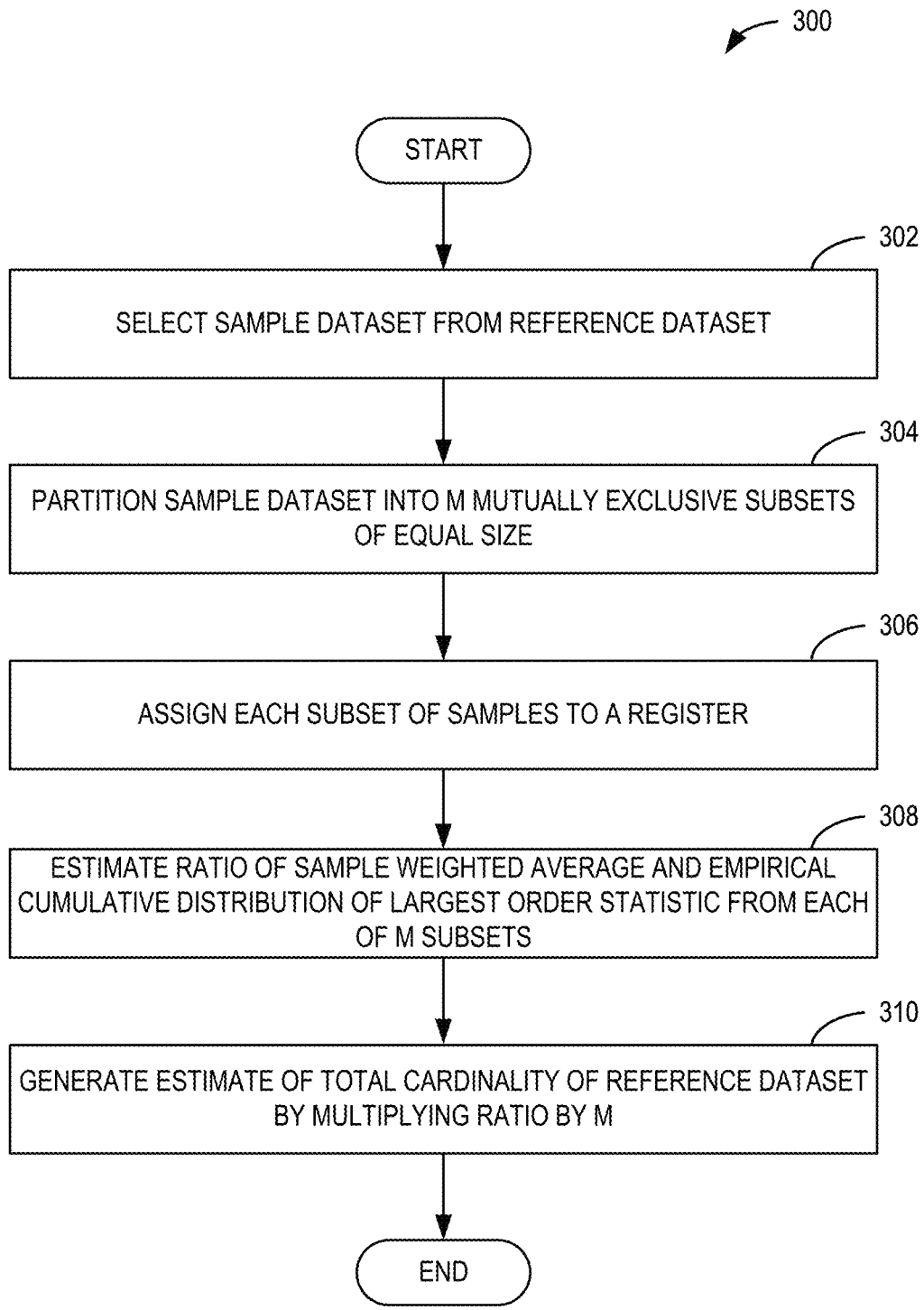
FIG. 3 is a flowchart representative of example machine readable instructions that may be executed by example processor circuitry to implement the example unique elements identification circuitry of FIG. 1 to estimate a total cardinality of a reference dataset.
Figure 4:
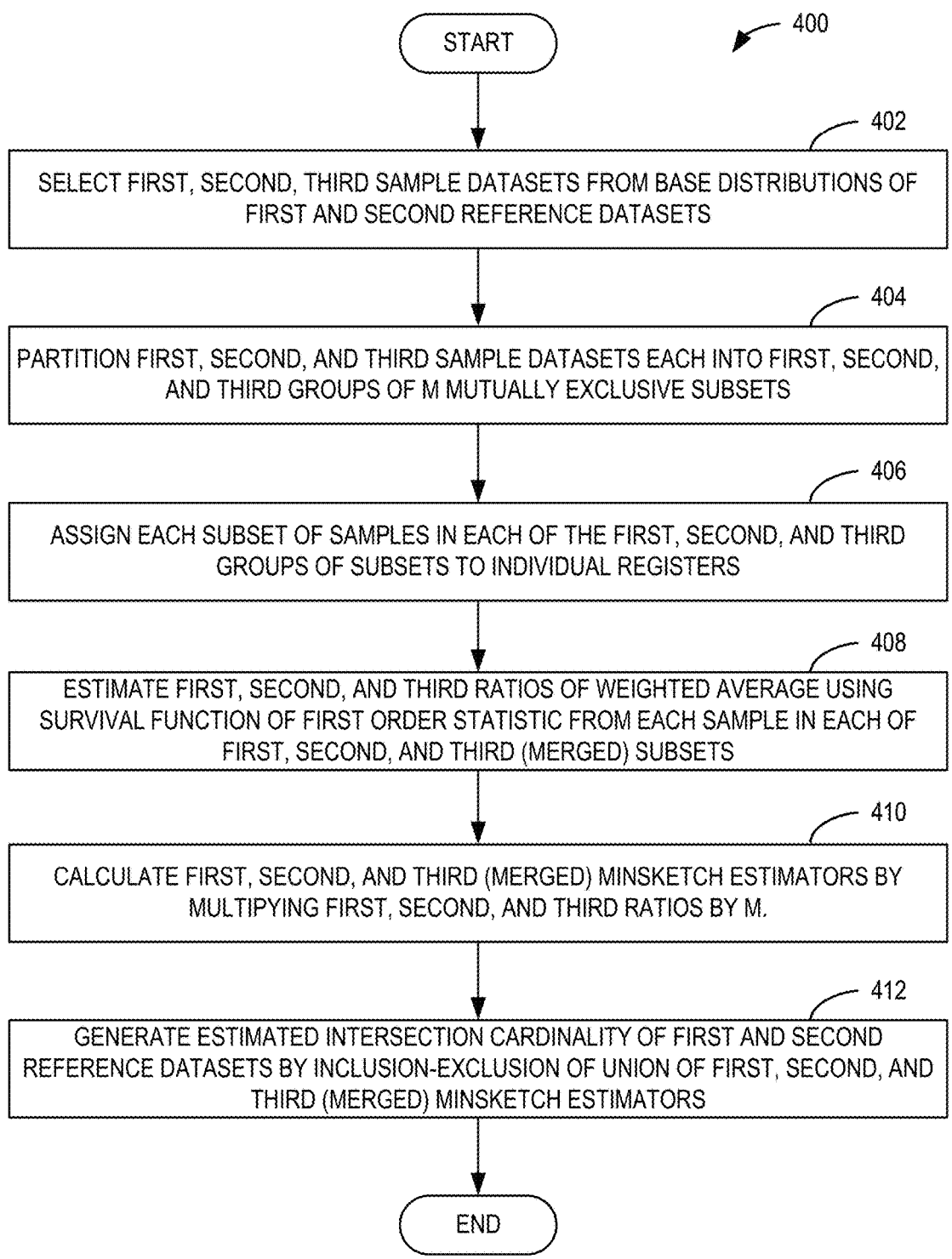
FIG. 4 is a flowchart representative of example machine readable instructions that may be executed by example processor circuitry to implement the example unique elements identification circuitry of FIG. 1 to estimate an intersection cardinality of two or more reference datasets.

In some examples, the register assignment circuitry 200 is instantiated by processor circuitry executing register assignment instructions and/or configured to perform operations such as those represented by the flowcharts of FIGS. 3 and 4.

In some examples, the unique elements identification circuitry 120 includes means for assigning a plurality of registers with subsets of reference media assets. For example, the means for assigning may be implemented by register assignment circuitry 200. In some examples, the register assignment circuitry 200 may be instantiated by processor circuitry such as the example processor circuitry 512 of FIG. 5. For instance, the register assignment circuitry 200 may be instantiated by the example microprocessor 600 of FIG. 6 executing machine executable instructions such as those implemented by at least blocks 306 in FIGS. 3 and 406 in FIG. 4. In some examples, the register assignment circuitry 200 may be instantiated by hardware logic circuitry, which may be implemented by an ASIC, XPU, or the FPGA circuitry 700 of FIG. 7 structured to perform operations corresponding to the machine readable instructions. Additionally or alternatively, the register assignment circuitry 200 may be instantiated by any other combination of hardware, software, and/or firmware. For example, the register assignment circuitry 200 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the means for assigning includes means for selecting a sample dataset from a reference dataset. In some examples, the means for assigning includes means for partitioning a sample dataset into m mutually exclusive subsets of equal size. In some examples, the means for assigning includes means for populating a memory with the sample dataset (e.g., the group of subsets that are included in the sample dataset).

In the illustrated example of FIG. 2, the maximum order statistic estimation circuitry 202 performs a series of operations on the m mutually exclusive subsets (e.g., stored the memory 104 and assigned to the group of registers 114) to first determine an "empirical ratio" of a weighted average of a discrete cumulative distribution of the maximum ordered statistics across the sample dataset 122 (e.g., the m subsets). The empirical ratio is related to the likelihood the maximum order statistic is randomly selected as a sample in the sample dataset 122. Then, the example maximum order statistic estimation circuitry 202 uses the empirical ratio found through a discrete summation of the empirical data (e.g., the sample dataset 122) to estimate a "continuous ratio" of a weighted average of a continuous cumulative distribution of the maximum ordered statistics across the reference dataset A 116. The continuous ratio is related to the likelihood the maximum order statistic is randomly selected as a sample in the reference dataset A 116. As used herein, the empirical ratio is a descriptive term for the ratio found through the empirical data of the sample dataset and the continuous ratio is a descriptive term for the ratio estimated using an integral across the domain of the reference dataset.

As discussed, in some examples, the register assignment circuitry 200 selects m random samples of $X_{(n)}$ and partitions the random samples into m mutually exclusive subsets of equal size (e.g., size "n" bits), where the entire sample dataset of sample reference media assets is N (e.g., N=n×m). Then, in some examples, there are m random samples of $X_{(n)}$. This can also be thought of producing an n×m array of samples from X and taking the maximum across each column producing m samples of $X_{(n)}$.

In some examples, $X_1, \ldots, X_n$ are n independent variates of the a distribution X across the reference dataset A 116. In some examples, each independent variate has a cumulative distribution function (CDF) F(x). Then the CDF of the largest reference media asset order statistic $X_{(n)}$ is given by Equation 1 below.

$$F_{(n)}(x) = Prob(X_{(n)} \leq x) \quad \text{Equation 1}$$
$$= Prob(\text{all } X_i \leq x)$$
$$= [F(x)]^n.$$

In some examples, the formal notation is $F_{X_{(n)}}(x)$, but the shorthand $F_{(n)}(x)$ may be used (such as in Equation 1). For example, Equation 1 refers to the CDF of the largest reference media asset order statistic $X_{(n)}$ equals the probability that, for a current reference media asset (x), all order statistics in the base distribution X are less than or equal to the order statistic of the current reference media asset (x). As used herein, the abbreviated notation illustrated in Equation 1 means the example maximum order statistic estimation circuitry 202 performs operations on the base distribution X of the reference dataset A 116 to determine a maximum order statistic for each subset of the sample dataset 122 because a single base distribution is used (e.g., there are no comparisons between multiple different base distributions, such as between a base distribution X and a base distribution Y).

In some examples, for discrete distributions the probability mass function is represented as $f_{(n)}(x)$, with $f_{(n)}(x) = Prob(\max\{X_1, \ldots, X_n\} = x)$.

The example maximum order statistic estimation circuitry 202 can compute an estimator for n (e.g., the maximum order statistic for each subset of samples) by taking the expected value of the logarithm of both sides of Equation 1 (e.g., $F_{(n)}(x) = [F(x)]^n$) with respect to the base distribution of $X_{(n)}$ and then dividing to isolate n on one side of the equation. The steps involved to compute the estimator for n are shown below in Equation 2.

$$F_{(n)}(x) = [F(x)]^n \quad \text{Equation 2}$$
$$\log(F_{(n)}(x)) = n\log(F(x))$$
$$f_{(n)}(x)\log(F_{(n)}(x)) = f_{(n)}(x)n\log(F(x))$$
$$\sum_{x \in \Omega} f_{(n)}(x)\log(F_{(n)}(x)) = n\sum_{x \in \Omega} f_{(n)}(x)\log(F(x))$$
$$\mathbb{E}_{X_{(n)}}[\log(F_{(n)})] = n\mathbb{E}_{X_{(n)}}[\log(F)].$$

In some examples, the $\mathbb{E}_{X_{(n)}}$ indicates the expected value of the highest order statistic (e.g., maximum order statistic) across the cumulative distribution for a given subset of samples. In some examples, after taking the negative of each side of the bottom step of Equation 2 to make all quantities positive and then dividing to isolate the n on one side of the equation, the final empirical ratio estimator of the maximum order statistic for a discrete solution using the sample dataset 122 is shown in Equation 3.

$$n = \frac{\mathbb{E}_{X_{(n)}}[-\log(F_{(n)})]}{\mathbb{E}_{X_{(n)}}[-\log(F)]}. \quad \text{Equation 3}$$

While the derivation above in Equation 3 is shown for discrete distributions, in some examples, the continuous distribution (e.g., across the domain of the base distribution X) is analogous to producing the same final equation with the expectation being the integral across the domain of the base distribution X instead of a discrete summation of a subset of samples. An estimation of the resulting ratio $\hat{n}$ of the continuous distribution is shown in Equation 4 below.

$$\hat{n} = \frac{\hat{\mathbb{E}}_{X_{(n)}}[-\log(\hat{F}_{(n)})]}{\hat{\mathbb{E}}_{X_{(n)}}[-\log(F)]}. \quad \text{Equation 4}$$

In some examples, an estimate of Equation 3 can be made by using a sample weighted average of the empirical cumulative distribution of the sampled maximum statistics, shown in Equation 4. In some examples, the sampled maximum statistics include the determined maximum statistics in each subset of the sample dataset 122. The example maximum order statistic estimation circuitry 202 determines the maximum order statistic in each sample subset (e.g., the maximum order statistic per subset is stored in each register, among the group of registers 114, that was assigned one of the m subsets of samples from the sample dataset 122). For example, the maximum order statistic estimation circuitry 202 estimates a weighted average and empirical cumulative distribution of the determined maximum order statistics across each of them subsets of samples from the sample dataset 122. The example estimated weighted average and empirical cumulative distribution of the determined maximum order statistics is then divided by the cumulative distribution of the base distribution F(x) to generate an estimate $\hat{n}$ of the ratio of the continuous distribution relating to maximum ordered statistics of each subset of samples in the sample dataset 122. In some examples, the maximum order statistic estimation circuitry 202 ignores any term where $\hat{F}_{(n)}(x) = 0$.

In some examples, the maximum order statistic estimation circuitry 202 determines the maximum order statistic for a given subset by examining each sample in the subset and comparing to a current maximum order statistic and replacing the maximum order statistic if the current examined sample is greater in value that the maximum ordered statistic stored in the assigned register. For example, take pure number values as the samples. The maximum order statistic estimation circuitry 202 may initialize the assigned register at 0 and then examine each sample in the subset systematically. In some examples, the first sample is the value 3, so the maximum order statistic estimation circuitry 202 replaces the value 0 in the assigned register with the value 3. In some examples, the next sample is 1, which does not cause the maximum order statistic estimation circuitry 202 to replace the current value in the assigned register because 3 is greater than 1. This process continues until the maximum order statistic estimation circuitry 202 has examined each sample in the subset stored in memory 104 and once finished, the current value in the assigned register is the maximum order statistic of the subset.

In some examples, the maximum order statistic estimation circuitry 202 is instantiated by processor circuitry executing maximum order statistic estimation instructions and/or configured to perform operations such as those represented by the flowchart of FIG. 3.

In some examples, the unique elements identification circuitry 120 includes means for estimating a ratio of a sample weighted average and empirical cumulative distribution of a largest order statistic from each of the m subsets over the cumulative distribution of the base distribution. For example, the means for estimating may be implemented by maximum order statistic estimation circuitry 202. In some examples, the maximum order statistic estimation circuitry 202 may be instantiated by processor circuitry such as the example processor circuitry 512 of FIG. 5. For instance, the maximum order statistic estimation circuitry 202 may be instantiated by the example microprocessor 600 of FIG. 6 executing machine executable instructions such as those implemented by at least block 308 in FIG. 3. In some examples, the maximum order statistic estimation circuitry 202 may be instantiated by hardware logic circuitry, which may be implemented by an ASIC, XPU, or the FPGA circuitry 700 of FIG. 7 structured to perform operations corresponding to the machine readable instructions. Additionally or alternatively, the maximum order statistic estimation circuitry 202 may be instantiated by any other combination of hardware, software, and/or firmware. For example, the maximum order statistic estimation circuitry 202 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In the illustrated example of FIG. 2, the minimum order statistic estimation circuitry 204 performs a series of operations on the m mutually exclusive subsets, stored in the memory 104 and assigned to the group of registers 114, to first determine an empirical ratio of a weighted average of a discrete cumulative distribution of the minimum ordered statistics across the sample dataset 122 (e.g., the m subsets). The empirical ratio is related to the likelihood the minimum order statistic is randomly selected as a sample in the sample dataset 122. Then, the example minimum order statistic estimation circuitry 204 uses the empirical ratio found through a discrete summation of the empirical data (e.g., the sample dataset 122) to estimate a continuous ratio of a weighted average of a continuous cumulative distribution of the minimum ordered statistics across the base distribution X of the reference dataset A 116. The continuous ratio is related to the likelihood the minimum order statistic is randomly selected as a sample in the reference dataset A 116. In some examples, the minimum order statistic estimation circuitry 204 performs the process to estimate the continuous ratio of a weighted average of a continuous cumulative distribution of the minimum ordered statistics across the base distribution X of additional reference datasets, such as reference dataset B 118, to enable an estimated intersection cardinality across multiple datasets.

Recalling the final step of Equation 1, the CDF of the largest order statistic of the base distribution X is given by $F_{(n)}(x)=[F(x)]^n$. In some examples, $X_1, \ldots, X_n$ are n independent variates of the base distribution X across the reference dataset A 116. In some examples, each independent variate has a cumulative distribution function (CDF) F(x). Then the CDF of the reference media asset minimum order statistic $X_{(1)}$ is given by Equation 5 below.

$$F_{(1)}(x) = Prob(X_{(1)} \le x) \quad \text{Equation 5}$$
$$= 1 - Prob(X_{(1)} > x)$$
$$= 1 - Prob(\text{all } X_i > x)$$
$$= 1 - [1 - F(x)]^n.$$

In some examples, the formal notation is $F_{X_{(i)}}(x)$, but the shorthand $F_{(1)}(x)$ may be used (such as in Equation 5). For example, Equation 5 refers to the CDF of the reference media asset minimum order statistic $X_{(1)}$, which equals the probability that, for a current reference media asset (x), all order statistics in the base distribution X are greater than or equal to the order statistic of the current reference media asset (x).

In some examples, for discrete distributions the probability mass function is represented as $f_{(1)}(x)$, with $f_{(1)}(x)=Prob(\min\{X_1, \ldots, X_n\}=x)$.

The example minimum order statistic estimation circuitry 204 can compute an estimator for n. In some examples, the estimator for n is a ratio that determines the likelihood, for any randomly selected sample among one of the m subsets of samples from the sample dataset 122, that the selected sample will be the minimum order statistic across the discrete distribution of a given subset of samples from the empirical sample dataset 122. The estimator for n is computed by taking the expected value of the logarithm of both sides of the final step of Equation 5 (e.g., $1-F_{(1)}(x)=[1-F(x)]^n$) with respect to the first order statistic $X_{(1)}$ and using the survival function as a substitute (e.g., $1-F(x)=S(x)$). The steps involved to compute the empirical ratio n for a minimum ordered statistic across the cumulative distribution for a given subset of samples are shown below in Equation 6.

$$1 - F_{(1)}(x) = [1 - F(x)]^n \quad \text{Equation 6}$$
$$S_{(1)}(x) = [S(x)]^n$$
$$f_{(1)}(x)\log(S_{(1)}(x)) = f_{(1)}(x)n\log(S(x))$$
$$\sum_{x \in \Omega} f_{(1)}(x)\log(S_{(1)}(x)) = n\sum_{x \in \Omega} f_{(1)}(x)\log(S(x))$$
$$\mathbb{E}_{X_{(1)}}[\log(S_{(1)})] = n\mathbb{E}_{X_{(1)}}[\log(S)].$$

In some examples, the $\mathbb{E}_{X_{(1)}}$ indicates the expected value of the first order statistic (e.g., minimum order statistic, lowest order statistic) across the cumulative distribution for a given subset of samples. In some examples, after taking the negative of each side of the last step of Equation 6 to make all quantities positive and then dividing to isolate the n on one side of the equation, the final empirical ratio estimator of the minimum order statistic for a discrete solution using the sample dataset 122 is shown in Equation 37.

$$n = \frac{\mathbb{E}_{X_{(1)}}[-\log(S_{(n)})]}{\mathbb{E}_{X_{(1)}}[-\log(S)]}. \quad \text{Equation 7}$$

While the derivation above in Equation 7 is shown for discrete distributions, in some examples, the continuous distribution (e.g., across the domain of the base distribution X) is analogous to producing the same final equation with the expectation being the integral across the domain of the base distribution X instead of a discrete summation of a subset of samples from the sample dataset 122. An estimation of the resulting minimum order statistic n̂ of the continuous distribution is shown in Equation 8 below.

$$\hat{n} = \frac{\hat{\mathbb{E}}_{X_{(n)}}[-\log(\hat{S}_{(n)})]}{\hat{\mathbb{E}}_{X_{(n)}}[-\log(S)]}. \qquad \text{Equation 8}$$

In some examples, an estimate of Equation 7 can be made by using a sample weighted average of the empirical cumulative distribution of the sampled minimum statistics, shown in Equation 8. In some examples, the sampled minimum statistics include the determined minimum statistics in each subset of the sample dataset 122. The example minimum order statistic estimation circuitry 204 determines the minimum order statistic in each sample subset (e.g., in each register, among the group of registers 114, that was assigned one of the m subsets of samples from the sample dataset 122). For example, the minimum order statistic estimation circuitry 204 estimates a weighted average and empirical cumulative distribution of the determined minimum order statistics across each of the m subsets of samples from the sample dataset 122. The example estimated weighted average and empirical cumulative distribution of the determined minimum order statistics is then divided by the cumulative distribution of the base distribution F(x) to generate an estimate n̂ of the ratio of the continuous distribution relating to minimum ordered statistics of each subset of samples in the sample dataset 122. In some examples, the minimum order statistic estimation circuitry 202 ignores any term where $\hat{S}_{(1)}(x)=0$.

The example minimum order statistic estimation circuitry 202 may perform the operations described above for any reference dataset and can repeat the same set of operations multiple times on multiple different reference datasets. For example, the minimum order statistic estimation circuitry 202 may perform the operations to generate an estimate n of the ratio of the continuous distribution relating to minimum ordered statistics of each subset of samples in a sample dataset 122 that was selected from reference dataset A 116 and then the minimum order statistic estimation circuitry 202 may perform the same operations to generate an estimate n̂ of the ratio of the continuous distribution relating to minimum ordered statistics of each subset of samples in a sample dataset 122 that was selected from reference dataset B 118. The example minimum order statistic estimation circuitry 202 can repeat the process any number of times to enable the example cardinality estimation circuitry 206 (described below) to estimate an intersection cardinality across two or more reference datasets (e.g., a merged set of reference media assets common to each reference dataset).

In some examples, the minimum order statistic estimation circuitry 204 determines the minimum order statistic for a given subset by examining each sample in the subset and comparing to a current minimum order statistic and replacing the minimum order statistic if the current examined sample is less in value that the minimum ordered statistic stored in the assigned register. For example, take pure number values as the samples. The minimum order statistic estimation circuitry 204 may initialize the assigned register with the first sample value and then examine each sample in the subset systematically. In some examples, the first sample is the value 3, so the minimum order statistic estimation circuitry 202 initializes the assigned register with the value 3 in the assigned register with the value 3. In some examples, the next sample is 1, which causes the minimum order statistic estimation circuitry 204 to replace the current value in the assigned register because 1 is less than 3. This process continues until the minimum order statistic estimation circuitry 204 has examined each sample in the subset stored in memory 104 and once finished, the current value in the assigned register is the minimum order statistic of the subset.

In some examples, the minimum order statistic estimation circuitry 204 is instantiated by processor circuitry executing minimum order statistic estimation instructions and/or configured to perform operations such as those represented by the flowchart of FIG. 4.

In some examples, the unique elements identification circuitry 120 includes means for estimating a ratio of a sample weighted average and empirical cumulative distribution of a first order statistic from each of the m subsets over the cumulative distribution of the base distribution. For example, the means for estimating may be implemented by minimum order statistic estimation circuitry 204. In some examples, the minimum order statistic estimation circuitry 204 may be instantiated by processor circuitry such as the example processor circuitry 512 of FIG. 5. For instance, the minimum order statistic estimation circuitry 204 may be instantiated by the example microprocessor 600 of FIG. 6 executing machine executable instructions such as those implemented by at least block 408 in FIG. 4. In some examples, the minimum order statistic estimation circuitry 204 may be instantiated by hardware logic circuitry, which may be implemented by an ASIC, XPU, or the FPGA circuitry 700 of FIG. 7 structured to perform operations corresponding to the machine readable instructions. Additionally or alternatively, the minimum order statistic estimation circuitry 204 may be instantiated by any other combination of hardware, software, and/or firmware. For example, the minimum order statistic estimation circuitry 204 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In the illustrated example of FIG. 2, the cardinality estimation circuitry 206 performs operations with the results of either the single n̂ ratio estimator (derived from a single reference dataset) obtained from the maximum order statistic estimation circuitry 202 or the multiple n̂ ratio estimators (derived from multiple reference datasets) obtained from the minimum order statistic estimation circuitry 204.

Upon obtaining the single maximum order n̂ ratio estimator from the example maximum order statistic estimation circuitry 202, the example cardinality estimation circuitry 206 uses the single n ratio estimator as an algorithm to estimate an unknown cardinality of the reference dataset used to produce the sample dataset 122 (e.g., reference dataset A 116). For example, assume the true number of unique entries in the reference dataset A 116 is N (e.g., N=n×m) and the register assignment circuitry 200 selects N random samples from the distribution X(e.g., from the reference dataset A 116) with the cumulative distribution function F(x). Then the example register assignment circuitry 200 partitions the N=n×m samples into m mutually exclusive and equal subsets (each of the m subsets being assigned to a register among the group of registers 114) and the maximum order statistic within each is taken, yielding m samples of $X_{(n)}$, each $X_{(n)}$ being stored in each of the utilized registers. Then the example maximum order statistic estimation circuitry 202 estimates n (specifically the maximum order statistic n̂ ratio estimator as illustrated in Equation 4). Finally, the example cardinality estimation circuitry 206 then estimates N (specifically an N̂ ratio estimator) by multiplying the maximum order statistic n̂ ratio estimator, obtained from the example maximum order statistic estimation circuitry 202, by m (e.g., the m mutually exclusive and equal subsets), illustrated in Equation 9.

$$\hat{N} = m\left(\frac{\hat{\mathbb{E}}_{X_{(n)}}[-\log(\hat{F}_{(n)})]}{\hat{\mathbb{E}}_{X_{(n)}}[-\log(F)]}\right). \quad \text{Equation 9}$$

As used herein, N̂ ratio estimator shown in Equation 9, when calculated using the n̂ ratio estimator obtained from the example maximum order statistic estimation circuitry 202, is referred to as the MaxSketch estimator.

Alternatively, upon obtaining the multiple minimum order statistic n̂ ratio estimators (each related to a different reference dataset, such as reference dataset A 116 and reference dataset B 118) from the example minimum order statistic estimation circuitry 204, the example cardinality estimation circuitry 206 uses the minimum order statistic n̂ ratio estimators as an algorithm to enable the prediction of an estimated intersection cardinality of the reference datasets. For example, assume the true number of unique entries in the reference dataset A 116 is N (e.g., N=n×m) and the register assignment circuitry 200 selects N random samples from the distribution X of reference dataset A 116 with the cumulative distribution function F(x). Then the example register assignment circuitry 200 partitions the N=n×m samples from reference dataset A 116 into m mutually exclusive and equal subsets (each of the m subsets being assigned to a register among the group of registers 114) and the minimum order statistic within each is taken, yielding m samples of $X_{(1)}$, each $X_{(1)}$ per subset being stored in each corresponding assigned register.

Then the example minimum order statistic estimation circuitry 204 estimates n (specifically the minimum order statistic n̂ ratio estimator as illustrated in Equation 8) corresponding to reference dataset A 116. Finally, the example cardinality estimation circuitry 206 then estimates N (specifically an N̂ ratio estimator) for reference dataset A 116 by multiplying the minimum order statistic n̂ ratio estimator, obtained from the example minimum order statistic estimation circuitry 202, by m (e.g., the m mutually exclusive and equal subsets), illustrated in Equation 10.

$$\hat{N} = m\left(\frac{\hat{\mathbb{E}}_{X_{(n)}}[-\log(\hat{S}_{(n)})]}{\hat{\mathbb{E}}_{X_{(n)}}[-\log(S)]}\right). \quad \text{Equation 10}$$

The example process described above leading to Equation 10 is then repeated for the reference dataset B 118. Thus, according to the illustrated example in FIG. 2, the cardinality estimation circuitry 206 obtains multiple minimum order statistic n̂ ratio estimators from the example minimum order statistic estimation circuitry 204 (each minimum order statistic n̂ ratio estimator corresponding to a separate reference dataset). For clarity, the first minimum order statistic ratio estimator corresponding to the first reference dataset A 116 will be designated as minimum order statistic ratio estimator $\hat{n}_A$ and the second minimum order statistic ratio estimator corresponding to the second reference dataset B 118 will be designated as minimum order statistic ratio estimator $\hat{n}_B$. For example, the cardinality estimation circuitry 206 may obtain a first minimum order statistic ratio estimator $\hat{n}_A$ based on a minimum order statistic n ratio estimate calculated from reference dataset A 116 and may obtain a second minimum order statistic ratio estimator $\hat{n}_B$ based on a minimum order statistic n̂ ratio estimate calculated from reference dataset B 118. Thus, the example cardinality estimation circuitry 206 calculates a first $\hat{N}_A$ ratio estimator using the first minimum order statistic ratio estimator $\hat{n}_A$ (generated from reference dataset A 116) and multiplied by m and calculates a second $\hat{N}_B$ ratio estimator using the second minimum order statistic ratio estimator $\hat{n}_B$ generated from reference dataset B 118 and multiplied by m.

As used herein, an N̂ ratio estimator (e.g., the continuous distribution ratio estimator), when calculated using a minimum order statistic n̂ ratio estimator (e.g., the discrete distribution/empirical ratio estimator) obtained from the example minimum order statistic estimation circuitry 204, is referred to as a MinSketch estimator. Thus, according to the example described, the first $\hat{N}_A$ ratio estimator generated from the reference dataset A 116 may be referred to as the first MinSketch estimator and the second $\hat{N}_B$ ratio estimator generated from the reference dataset B 118 may be referred to as the second MinSketch estimator.

In some examples, if datasets are merged, then either a MaxSketch or MinSketch estimator must be used for both datasets to provide useful data.

The example cardinality estimation circuitry 206 then generates an estimated intersection cardinality of the reference dataset A 116 and the reference dataset B 118 by using the inclusion-exclusion principle of a union of datasets. For example, the inclusion-exclusion principle of a dataset A and a dataset B is symbolically represented in Equation 11 below.

$$|A \cup B| = |A| + |B| - |A \cap B|$$

$$|A \cap B| = |A| + |B| - |A \cup B| \quad \text{Equation 11.}$$

From Equation 11, the union of dataset A and B is equal to dataset A plus dataset B minus the intersection of dataset A and B. In some examples, from the first step in Equation 11, if the intersection of dataset A and B were not subtracted, then the values within the intersection of dataset A and B would be counted twice (once in dataset A and once in dataset B). Thus, isolating the intersection of dataset A and B on one side of the equation yields the intersection of dataset A and B is equal to dataset A plus dataset B minus the union of dataset A and B. Applying the first and second MinSketch estimators, $\hat{N}_A$ and $\hat{N}_B$, to Equation 11, the cardinality estimation circuitry 206 generates the estimated intersection cardinality by an application of Equation 12 below.

$$\hat{N}(A \cup B) = \hat{N}_A + \hat{N}_A - \hat{N}(A \cap B) \quad \text{Equation 12.}$$

Thus, according to the illustrated example of FIG. 2, the register assignment circuitry 200 selects a first sample dataset 122 from the reference dataset A 116, partitions the first sample dataset 122 into m mutually exclusive subsets (e.g., of n size), causes the storage of them mutually exclusive subsets into memory 104, and assigns each of the m subsets to an individual register among a first set of registers in the group of registers 114. Then the example register assignment circuitry 200 selects a second sample dataset 122 from the reference dataset B 118, partitions the second sample dataset 122 into m mutually exclusive subsets (e.g., of n size), causes the storage of the m mutually exclusive subsets into memory 104, and assigns each of the m subsets to an individual register among a second set of registers in the group of registers 114. Finally, the example register assignment circuitry 200 selects a merged sample dataset that is the combination (e.g., union) of the first sample dataset and the second sample dataset (both versions of 122) from the reference datasets A and B (116 and 118), partitions the merged sample dataset into m mutually exclusive subsets (e.g., of n size), causes the storage of the m mutually exclusive subsets into memory 104, and assigns each of the m subsets to an individual register among a third set of registers in the group of registers 114. In some examples, the merged sample dataset is the component wise minimum of each register (e.g., the lowest order statistic across both the first and second sample datasets).

In the illustrated example of FIG. 2, the example minimum order statistic estimation circuitry 204 then estimates the $\hat{n}_A$ ratio, the $\hat{n}_B$ ratio, and the $\hat{n}_{A \cup B}$ ratio (e.g., the ratio of the merged sample dataset that was selected from both reference datasets A and B (116 and 118)), applying the principles discussed above in relationship to Equations 5-8.

Then, according to the illustrated example, the cardinality estimation circuitry 206 uses the $\hat{n}_A$, $\hat{n}_B$, and $\hat{n}_{A \cup B}$ minimum order statistic ratio estimators to calculate MinSketch estimators $\hat{N}_A$, $\hat{N}_B$, and $\hat{N}_{A \cup B}$, applying the principles discussed above in relationship to Equation 10. Finally, the example cardinality estimation circuitry 206 generates the estimated intersection cardinality of the reference dataset A 116 with the reference dataset B 118, by applying the calculated MinSketch estimators to Equation 12.

In some examples, the cardinality estimation circuitry 206 is instantiated by processor circuitry executing cardinality estimation instructions and/or configured to perform operations such as those represented by the flowcharts of FIGS. 3 and 4.

In some examples, the unique elements identification circuitry 120 includes means for generating an estimate of a total cardinality of a reference dataset. For example, the means for generating may be implemented by cardinality estimation circuitry 206. In some examples, the cardinality estimation circuitry 206 may be instantiated by processor circuitry such as the example processor circuitry 512 of FIG. 5. For instance, the cardinality estimation circuitry 206 may be instantiated by the example microprocessor 600 of FIG. 6 executing machine executable instructions such as those implemented by at least blocks 310 in FIGS. 3 and 410, 412 in FIG. 4. In some examples, the cardinality estimation circuitry 206 may be instantiated by hardware logic circuitry, which may be implemented by an ASIC, XPU, or the FPGA circuitry 700 of FIG. 7 structured to perform operations corresponding to the machine readable instructions. Additionally or alternatively, the cardinality estimation circuitry 206 may be instantiated by any other combination of hardware, software, and/or firmware. For example, the cardinality estimation circuitry 206 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the means for generating includes means for calculating a MaxSketch estimator. In some examples the MaxSketch estimator is an $\hat{N}$ ratio estimator (e.g., calculated from Equation 9) when calculated using a maximum order statistic $\hat{n}$ ratio estimator obtained from the example maximum order statistic estimation circuitry 202.

In some examples, the means for generating includes means for calculating a MinSketch estimator. In some examples the MinSketch estimator is an N ratio estimator (e.g., calculated from Equation 10) using a minimum order statistic n ratio estimator obtained from the example minimum order statistic estimation circuitry 204. In some examples, the cardinality estimation circuitry 206 calculates the MinSketch estimator with merged sample datasets from more than one reference dataset (e.g., reference datasets A and B (116 and 118)).

In some examples, the means for generating includes means for generating an estimated intersection cardinality of multiple reference datasets (e.g., reference datasets A and B (116 and 118) by an inclusion-exclusion principle of the union of the multiple datasets. Although two reference datasets are used in the example, the means may be adapted to generate an estimated intersection cardinality of more than two reference datasets.

In some examples, each of the samples is not random but instead is streamed one sample at a time into a memory 104. For example, the unique elements identification circuitry 120 may hash an entry/sample. In some examples, the unique elements identification circuitry 120 may implement the HyperLogLog to determine the sample's register and rank, and then updates the register's rank accordingly. In some examples, the unique elements identification circuitry 120 tracks the summary statistics for each register (e.g., the minimum value observed, the maximum value observed, etc.) In some examples, after all the data has been observed, or some after pre-determined length of time (e.g., an hour, day, etc. has passed), the unique elements identification circuitry 120 uses the summary statistics of each register to determine the cardinality. For example, if there are 1,000 registers, then possibly billions or trillions of records have been reduced to 1,000 values which can be used to estimate the overall cardinality of the reference dataset.

While an example manner of implementing the unique elements identification circuitry 120 of FIG. 1 is illustrated in FIG. 2, one or more of the elements, processes, and/or devices illustrated in FIG. 2 may be combined, divided, re-arranged, omitted, eliminated, and/or implemented in any other way. Further, the example register assignment circuitry 200, the example maximum order statistic estimation circuitry 202, the example minimum order statistic estimation circuitry 204, the example cardinality estimation circuitry 206, and/or, more generally, the example unique elements identification circuitry 120 of FIG. 1, may be implemented by hardware alone or by hardware in combination with software and/or firmware. Thus, for example, any of the example register assignment circuitry 200, the example maximum order statistic estimation circuitry 202, the example minimum order statistic estimation circuitry 204, the example cardinality estimation circuitry 206, and/or, more generally, the example unique elements identification circuitry 120, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example unique elements identification circuitry 120 of FIG. SysFig may include one or more elements, processes, and/or devices in addition to, or instead of, those illustrated in FIG. 2, and/or may include more than one of any or all of the illustrated elements, processes and devices.

A flowchart representative of example hardware logic circuitry, machine readable instructions, hardware implemented state machines, and/or any combination thereof for implementing the unique elements identification circuitry 120 of FIG. 2 is shown in FIG. 3. The machine readable instructions may be one or more executable programs or portion(s) of an executable program for execution by processor circuitry, such as the processor circuitry 512 shown in the example processor platform 500 discussed below in connection with FIG. 5 and/or the example processor circuitry discussed below in connection with FIGS. 6 and/or 7. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowchart illustrated in FIG. 3, many other methods of implementing the example unique elements identification circuitry 120 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU, an XPU, etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 3-4 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium, non-transitory computer readable storage medium, non-transitory machine readable medium, and non-transitory machine readable storage medium are expressly defined to include any type of computer readable storage device and/or storage disk and to exclude propagating signals and to exclude transmission media. As used herein, the terms "computer readable storage device" and "machine readable storage device" are defined to include any physical (mechanical and/or electrical) structure to store information, but to exclude propagating signals and to exclude transmission media. Examples of computer readable storage devices and machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer readable instructions, machine readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 3 is a flowchart representative of example machine readable instructions and/or example operations 300 that may be executed and/or instantiated by processor circuitry to estimate a total cardinality of a reference dataset. The machine readable instructions and/or the operations 300 of FIG. 3 begin at block 302, at which the example register assignment circuitry 200 selects a sample dataset 122 (FIG. 1) from a base distribution of a reference dataset (e.g., reference dataset A 116 in FIG. 1). In some examples, the first reference dataset includes a base distribution of reference media assets (e.g., a reference media asset may be a value that identifies a media asset, such as a certain amount of video). In some examples, the reference dataset can (and usually does) include duplicate reference media assets.

At block 304, the example register assignment circuitry 200 partitions the sample dataset 122 into m mutually exclusive subsets of equal size (e.g., a size of n media assets). Thus, in some examples, the total number of reference media assets (e.g., samples) in the sample dataset 122 is N=m×n reference media assets.

At block 306, the example register assignment circuitry 200 assigns each subset of samples of reference media assets to a register (e.g., a register from the group of registers 114 in FIG. 1). Thus, a first register stores a first subset of samples, a second register stores a second subset of samples, and so on.

At block 308, the example maximum order statistic estimation circuitry 202 estimates a maximum order statistic ratio (e.g., a ratio estimator $\hat{n}$ of a sample weighted average and empirical cumulative distribution of a largest order statistic from each of the m subsets of samples. In some examples, the maximum order statistic estimation circuitry 202 performs the operations described corresponding to Equations 1~4 above to produce the ratio estimator $\hat{n}$.

At block 310, the example cardinality estimation circuitry 206 generates an estimate of the total cardinality of the reference dataset by multiplying the ratio estimator $\hat{n}$ by m to produce a MaxSketch ratio estimator $\hat{N}$. In some examples, the cardinality estimation circuitry 206 performs the operations described corresponding to Equation 9 above to produce the ratio estimator $\hat{N}$ that estimates the total cardinality of the reference dataset (e.g., reference dataset A 116). Once the total cardinality of the reference dataset has been estimated, the process of FIG. 3 completes.

FIG. 4 is a flowchart representative of example machine readable instructions and/or example operations 400 that may be executed and/or instantiated by processor circuitry to estimate an intersection cardinality of two or more reference datasets. The machine readable instructions and/or the operations 400 of FIG. 4 begin at block 402, at which the example register assignment circuitry 200 selects first, second, and third sample datasets 122 (FIG. 1) from a base distribution of a first reference dataset A 116 and a second reference dataset B 118. The example first sample dataset corresponds to the first reference dataset A 116, the example second sample dataset corresponds to the second reference dataset B 118, and the example third sample dataset is the merger (e.g., the union) of the example first sample dataset and the example second sample dataset. In some examples, the first and second reference datasets (116 and 118) include a base distributions of reference media assets.

At block 404, the example register assignment circuitry 200 partitions the first, second, and third sample datasets each (separately) into m mutually exclusive first, second, and third subsets. For example, the first sample data set is partitioned into a first group of m mutually exclusive subsets of samples, the second sample data set is partitioned into a second group of m mutually exclusive subsets of samples, and the third sample data set is partitioned into a third group of m mutually exclusive subsets of samples. In some examples, the size of each subset in each group is equal across the remaining subsets in the same group.

At block 406, the example register assignment circuitry 200 assigns each subset in each of the first, second, and third groups of subsets to individual registers. For example, the register assignment circuitry 200 assigns the first group of subsets, corresponding to the sample dataset selected from the first reference dataset A (116), to registers 1 to f (one subset per register). Then the example register assignment circuitry 200 assigns the second group of subsets, corresponding to the sample dataset selected from the second reference dataset B 118, to registers (f+1) to g (one subset per register). And, finally, the example register assignment circuitry 200 assigns the third group of subsets, corresponding to the sample dataset selected from the merger of the first and second groups of subsets, to registers (g+1) to h (one subset per register). Thus, in some examples, each assigned register stores one subset.

At block 408, the example minimum order statistic estimation circuitry 204 estimates a maximum order statistic ratio (e.g., a ratio estimator $\hat{n}$) of a sample weighted average and empirical cumulative distribution of a largest order statistic from each of them subsets of samples, separately for each of the three groups of subsets. As a result, the example minimum order statistic estimation circuitry 204. In some examples, the minimum order statistic estimation circuitry 204 performs the operations described corresponding to Equations 5-8 above to produce the discrete distribution (e.g., empirical) ratio estimators $\hat{n}_A$, $\hat{n}_B$, and $\hat{n}_{A \cup B}$. As described above, in some examples, the $\hat{n}_{A \cup B}$ discrete distribution ratio estimator is derived from the merger of the sample datasets selected from both the first and second reference datasets A and B (116 and 118).

At block 410, the example cardinality estimation circuitry 206 calculates first, second, and third MinSketch estimators, $\hat{N}_A$, $\hat{N}_B$, and $\hat{N}_{A \cup B}$, by multiplying each of the discrete distribution ratio estimators $\hat{n}_A$, $\hat{n}_B$ and $\hat{n}_{A \cup B}$ by m.

At block 412, the example cardinality estimation circuitry 206 generates an estimated intersection cardinality of the first and second reference datasets A and B (116 and 118) by performing operations based on the inclusion-exclusion principle as detailed above in the discussion related to Equations 11 and 12. Once the total estimated intersection cardinality of the first and second reference datasets has been estimated, the process of FIG. 4 completes.

Figure 5:
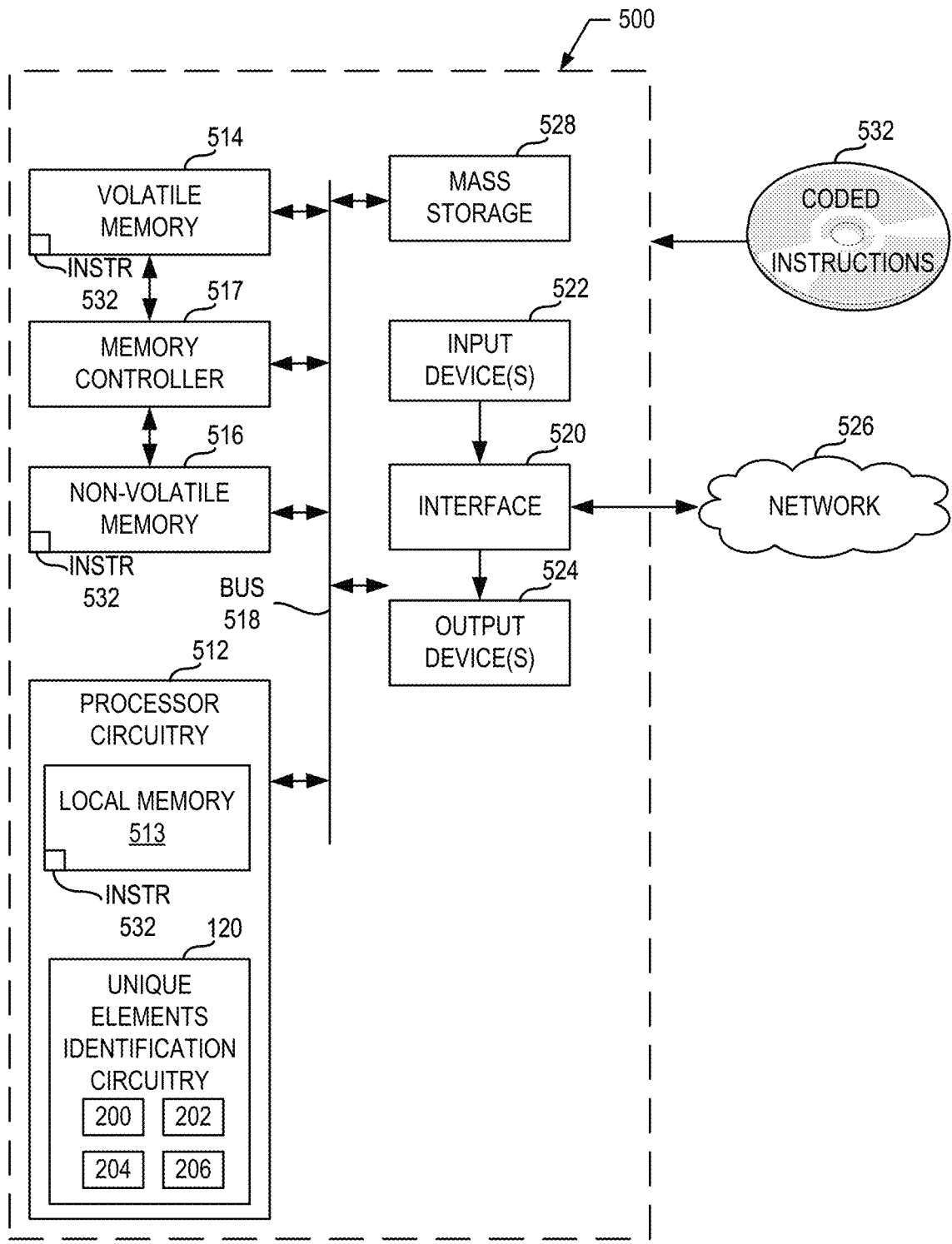
FIG. 5 is a block diagram of an example processing platform including processor circuitry structured to execute the example machine readable instructions of FIGS. 3 and/or 4 to implement the example unique elements identification circuitry of FIG. 1.

FIG. 5 is a block diagram of an example processor platform 500 structured to execute and/or instantiate the machine readable instructions and/or the operations of FIGS. 3-4 to implement the apparatus of FIG. 2. The processor platform 500 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device. In some examples, the machine readable instructions and/or the operations of FIGS. 3-4 cause processor circuitry 512 to perform the operations and/or instructions described.

The processor platform 500 of the illustrated example includes processor circuitry 512. The processor circuitry 512 of the illustrated example is hardware. For example, the processor circuitry 512 can be implemented by one or more integrated circuits, logic circuits, FPGAs, microprocessors, CPUs, GPUs, DSPs, and/or microcontrollers from any desired family or manufacturer. The processor circuitry 512 may be implemented by one or more semiconductor based (e.g., silicon based) devices. In this example, the processor circuitry 512 implements the register assignment circuitry 200, the maximum order statistic estimation circuitry 202, the minimum order statistic estimation circuitry 204, the cardinality estimation circuitry 206, and/or, more generally, the unique elements identification circuitry 120.

The processor circuitry 512 of the illustrated example includes a local memory 513 (e.g., a cache, registers, etc.). The processor circuitry 512 of the illustrated example is in communication with a main memory including a volatile memory 514 and a non-volatile memory 516 by a bus 518. The volatile memory 514 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 516 may be implemented by flash memory and/or any other desired type of memory device. Access to the main memory 514, 516 of the illustrated example is controlled by a memory controller 517.

The processor platform 500 of the illustrated example also includes interface circuitry 520. The interface circuitry 520 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 522 are connected to the interface circuitry 520. The input device(s) 522 permit(s) a user to enter data and/or commands into the processor circuitry 512. The input device(s) 522 can be implemented by, for example, an audio sensor, a microphone, a camera (still or video), a keyboard, a button, a mouse, a touchscreen, a track-pad, a trackball, an isopoint device, and/or a voice recognition system.

One or more output devices 524 are also connected to the interface circuitry 520 of the illustrated example. The output device(s) 524 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 520 of the illustrated example, thus, typically includes a graphics driver card, a graphics driver chip, and/or graphics processor circuitry such as a GPU.

The interface circuitry 520 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 526. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 500 of the illustrated example also includes one or more mass storage devices 528 to store software and/or data. Examples of such mass storage devices 528 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine readable instructions 532, which may be implemented by the machine readable instructions of FIGS. 3-4, may be stored in the mass storage device 528, in the volatile memory 514, in the non-volatile memory 516, and/or on a removable non-transitory computer readable storage medium such as a CD or DVD.

Figure 6:
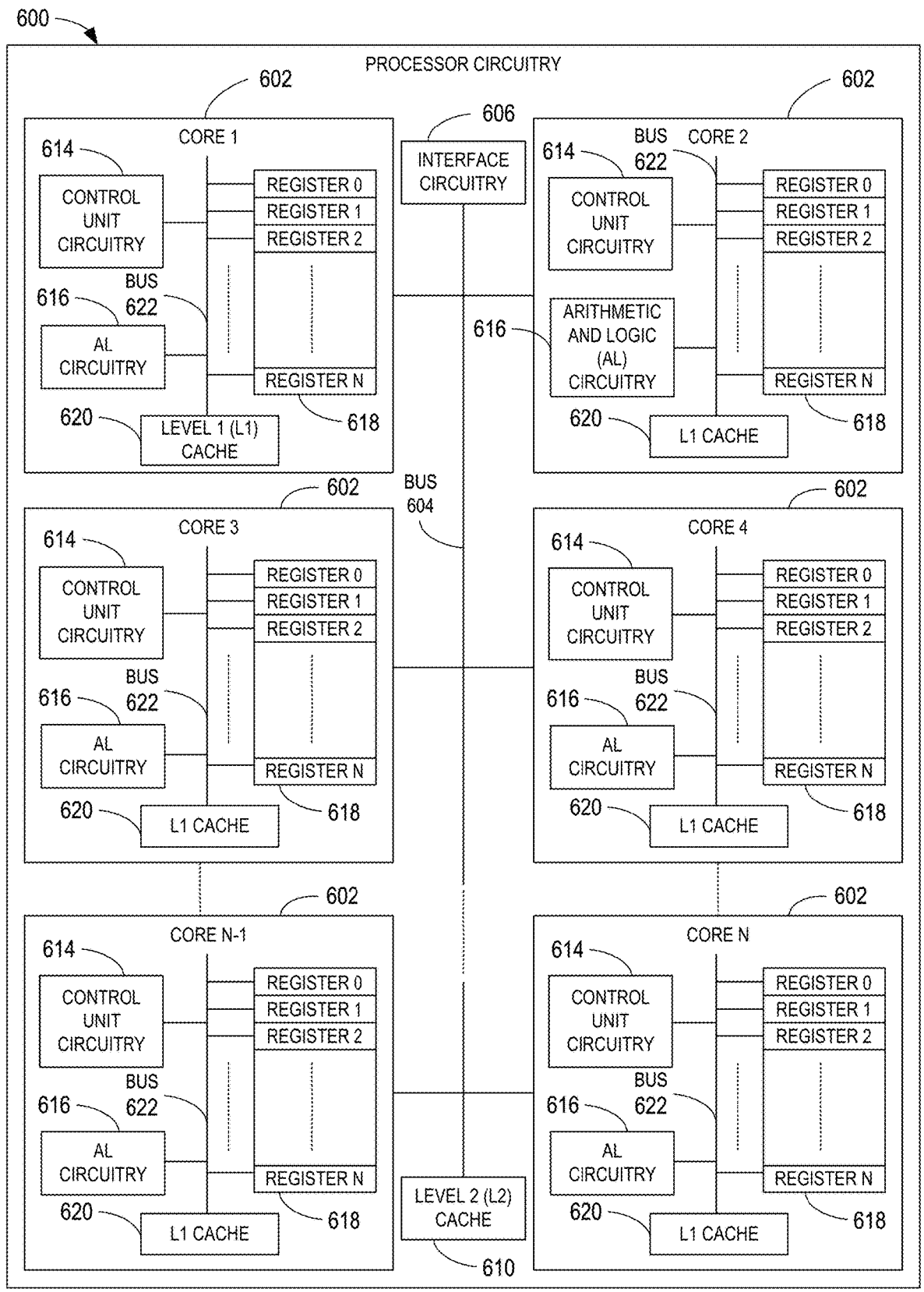
FIG. 6 is a block diagram of an example implementation of the processor circuitry of FIG. 5.

FIG. 6 is a block diagram of an example implementation of the processor circuitry 512 of FIG. 5. In this example, the processor circuitry 512 of FIG. 5 is implemented by a microprocessor 600. For example, the microprocessor 600 may be a general purpose microprocessor (e.g., general purpose microprocessor circuitry). The microprocessor 600 executes some or all of the machine readable instructions of the flowcharts of FIGS. 3-4 to effectively instantiate the circuitry of FIG. 2 as logic circuits to perform the operations corresponding to those machine readable instructions. In some such examples, the circuitry of FIG. 2 is instantiated by the hardware circuits of the microprocessor 600 in combination with the instructions. For example, the microprocessor 600 may be implemented by multi-core hardware circuitry such as a CPU, a DSP, a GPU, an XPU, etc. Although it may include any number of example cores 602 (e.g., 1 core), the microprocessor 600 of this example is a multi-core semiconductor device including N cores. The cores 602 of the microprocessor 600 may operate independently or may cooperate to execute machine readable instructions. For example, machine code corresponding to a firmware program, an embedded software program, or a software program may be executed by one of the cores 602 or may be executed by multiple ones of the cores 602 at the same or different times. In some examples, the machine code corresponding to the firmware program, the embedded software program, or the software program is split into threads and executed in parallel by two or more of the cores 602. The software program may correspond to a portion or all of the machine readable instructions and/or operations represented by the flowcharts of FIGS. 3-4.

The cores 602 may communicate by a first example bus 604. In some examples, the first bus 604 may be implemented by a communication bus to effectuate communication associated with one(s) of the cores 602. For example, the first bus 604 may be implemented by at least one of an Inter-Integrated Circuit (I2C) bus, a Serial Peripheral Interface (SPI) bus, a PCI bus, or a PCIe bus. Additionally or alternatively, the first bus 604 may be implemented by any other type of computing or electrical bus. The cores 602 may obtain data, instructions, and/or signals from one or more external devices by example interface circuitry 606. The cores 602 may output data, instructions, and/or signals to the one or more external devices by the interface circuitry 606. Although the cores 602 of this example include example local memory 620 (e.g., Level 1 (L1) cache that may be split into an L1 data cache and an L1 instruction cache), the microprocessor 600 also includes example shared memory 610 that may be shared by the cores (e.g., Level 2 (L2 cache)) for high-speed access to data and/or instructions. Data and/or instructions may be transferred (e.g., shared) by writing to and/or reading from the shared memory 610. The local memory 620 of each of the cores 602 and the shared memory 610 may be part of a hierarchy of storage devices including multiple levels of cache memory and the main memory (e.g., the main memory 514, 516 of FIG. 5). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 602 may be referred to as a CPU, DSP, GPU, etc., or any other type of hardware circuitry. Each core 602 includes control unit circuitry 614, arithmetic and logic (AL) circuitry (sometimes referred to as an ALU) 616, a plurality of registers 618, the local memory 620, and a second example bus 622. Other structures may be present. For example, each core 602 may include vector unit circuitry, single instruction multiple data (SIMD) unit circuitry, load/store unit (LSU) circuitry, branch/jump unit circuitry, floating-point unit (FPU) circuitry, etc. The control unit circuitry 614 includes semiconductor-based circuits structured to control (e.g., coordinate) data movement within the corresponding core 602. The AL circuitry 616 includes semiconductor-based circuits structured to perform one or more mathematic and/or logic operations on the data within the corresponding core 602. The AL circuitry 616 of some examples performs integer based operations. In other examples, the AL circuitry 616 also performs floating point operations. In yet other examples, the AL circuitry 616 may include first AL circuitry that performs integer based operations and second AL circuitry that performs floating point operations. In some examples, the AL circuitry 616 may be referred to as an Arithmetic Logic Unit (ALU). The registers 618 are semiconductor-based structures to store data and/or instructions such as results of one or more of the operations performed by the AL circuitry 616 of the corresponding core 602. For example, the registers 618 may include vector register(s), SIMD register(s), general purpose register(s), flag register(s), segment register(s), machine specific register(s), instruction pointer register(s), control register(s), debug register(s), memory management register(s), machine check register(s), etc. The registers 618 may be arranged in a bank as shown in FIG. 6. Alternatively, the registers 618 may be organized in any other arrangement, format, or structure including distributed throughout the core 602 to shorten access time. The second bus 622 may be implemented by at least one of an I2C bus, a SPI bus, a PCI bus, or a PCIe bus Each core 602 and/or, more generally, the microprocessor 600 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 600 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

FIG. 6 is a block diagram of another example implementation of the processor circuitry 512 of FIG. 5. In this example, the processor circuitry 512 is implemented by FPGA circuitry 700. For example, the FPGA circuitry 700 may be implemented by an FPGA. The FPGA circuitry 700 can be used, for example, to perform operations that could otherwise be performed by the example microprocessor 600 of FIG. 6 executing corresponding machine readable instructions. However, once configured, the FPGA circuitry 700 instantiates the machine readable instructions in hardware and, thus, can often execute the operations faster than they could be performed by a general purpose microprocessor executing the corresponding software.

Figure 7:
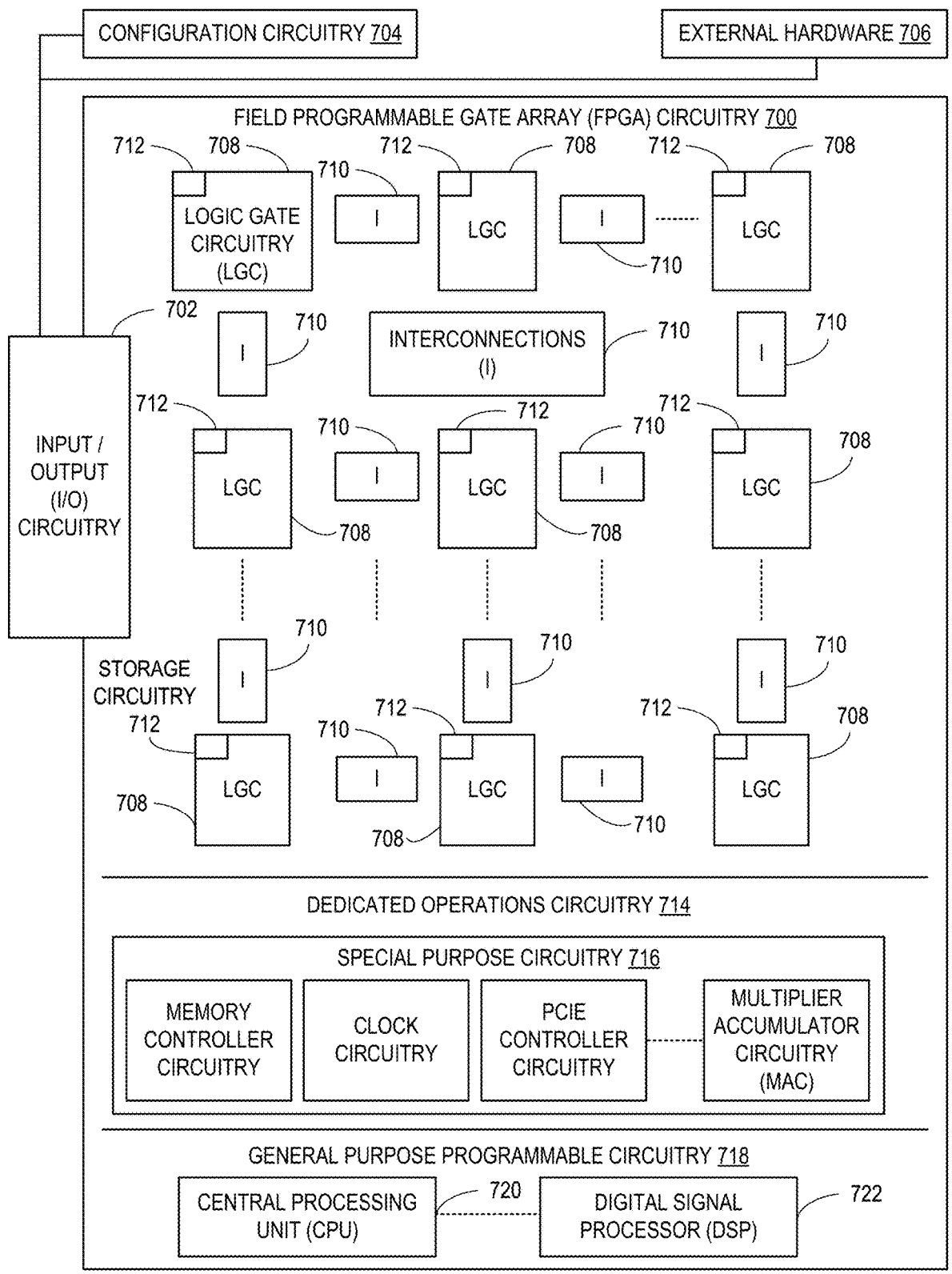
FIG. 7 is a block diagram of another example implementation of the processor circuitry of FIG. 5.

More specifically, in contrast to the microprocessor 600 of FIG. 6 described above (which is a general purpose device that may be programmed to execute some or all of the machine readable instructions represented by the flowcharts of FIGS. 3-4 but whose interconnections and logic circuitry are fixed once fabricated), the FPGA circuitry 700 of the example of FIG. 7 includes interconnections and logic circuitry that may be configured and/or interconnected in different ways after fabrication to instantiate, for example, some or all of the machine readable instructions represented by the flowcharts of FIGS. 3-4. In particular, the FPGA circuitry 700 may be thought of as an array of logic gates, interconnections, and switches. The switches can be programmed to change how the logic gates are interconnected by the interconnections, effectively forming one or more dedicated logic circuits (unless and until the FPGA circuitry 700 is reprogrammed). The configured logic circuits enable the logic gates to cooperate in different ways to perform different operations on data received by input circuitry. Those operations may correspond to some or all of the software represented by the flowcharts of FIGS. 3-4. As such, the FPGA circuitry 700 may be structured to effectively instantiate some or all of the machine readable instructions of the flowcharts of FIGS. 3-4 as dedicated logic circuits to perform the operations corresponding to those software instructions in a dedicated manner analogous to an ASIC. Therefore, the FPGA circuitry 700 may perform the operations corresponding to the some or all of the machine readable instructions of FIGS. 3-4 faster than the general purpose microprocessor can execute the same.

In the example of FIG. 7, the FPGA circuitry 700 is structured to be programmed (and/or reprogrammed one or more times) by an end user by a hardware description language (HDL) such as Verilog. The FPGA circuitry 700 of FIG. 7, includes example input/output (I/O) circuitry 702 to obtain and/or output data to/from example configuration circuitry 704 and/or external hardware 706. For example, the configuration circuitry 704 may be implemented by interface circuitry that may obtain machine readable instructions to configure the FPGA circuitry 700, or portion(s) thereof. In some such examples, the configuration circuitry 704 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 706 may be implemented by external hardware circuitry. For example, the external hardware 706 may be implemented by the microprocessor 600 of FIG. 6. The FPGA circuitry 700 also includes an array of example logic gate circuitry 708, a plurality of example configurable interconnections 710, and example storage circuitry 712. The logic gate circuitry 708 and the configurable interconnections 710 are configurable to instantiate one or more operations that may correspond to at least some of the machine readable instructions of FIGS. 3-4 and/or other desired operations. The logic gate circuitry 708 shown in FIG. 7 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 708 to enable configuration of the electrical structures and/or the logic gates to form circuits to perform desired operations. The logic gate circuitry 708 may include other electrical structures such as look-up tables (LUTs), registers (e.g., flip-flops or latches), multiplexers, etc.

The configurable interconnections 710 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 708 to program desired logic circuits.

The storage circuitry 712 of the illustrated example is structured to store result(s) of the one or more of the operations performed by corresponding logic gates. The storage circuitry 712 may be implemented by registers or the like. In the illustrated example, the storage circuitry 712 is distributed amongst the logic gate circuitry 708 to facilitate access and increase execution speed.

The example FPGA circuitry 700 of FIG. 7 also includes example Dedicated Operations Circuitry 714. In this example, the Dedicated Operations Circuitry 714 includes special purpose circuitry 716 that may be invoked to implement commonly used functions to avoid the need to program those functions in the field. Examples of such special purpose circuitry 716 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 700 may also include example general purpose programmable circuitry 718 such as an example CPU 720 and/or an example DSP 722. Other general purpose programmable circuitry 718 may additionally or alternatively be present such as a GPU, an XPU, etc., that can be programmed to perform other operations.

Although FIGS. 5 and 6 illustrate two example implementations of the processor circuitry 512 of FIG. 5, many other approaches are contemplated. For example, as mentioned above, modern FPGA circuitry may include an on-board CPU, such as one or more of the example CPU 720 of FIG. 7. Therefore, the processor circuitry 512 of FIG. 5 may additionally be implemented by combining the example microprocessor 600 of FIG. 6 and the example FPGA circuitry 700 of FIG. 7. In some such hybrid examples, a first portion of the machine readable instructions represented by the flowcharts of FIGS. 3-4 may be executed by one or more of the cores 602 of FIG. 6, a second portion of the machine readable instructions represented by the flowcharts of FIGS. 3-4 may be executed by the FPGA circuitry 700 of FIG. 7, and/or a third portion of the machine readable instructions represented by the flowcharts of FIGS. 3-4 may be executed by an ASIC. It should be understood that some or all of the circuitry of FIG. 2 may, thus, be instantiated at the same or different times. Some or all of the circuitry may be instantiated, for example, in one or more threads executing concurrently and/or in series. Moreover, in some examples, some or all of the circuitry of FIG. 2 may be implemented within one or more virtual machines and/or containers executing on the microprocessor.

In some examples, the processor circuitry 512 of FIG. 5 may be in one or more packages. For example, the microprocessor 600 of FIG. 6 and/or the FPGA circuitry 700 of FIG. 7 may be in one or more packages. In some examples, an XPU may be implemented by the processor circuitry 512 of FIG. 5, which may be in one or more packages. For example, the XPU may include a CPU in one package, a DSP in another package, a GPU in yet another package, and an FPGA in still yet another package.

Figure 8:
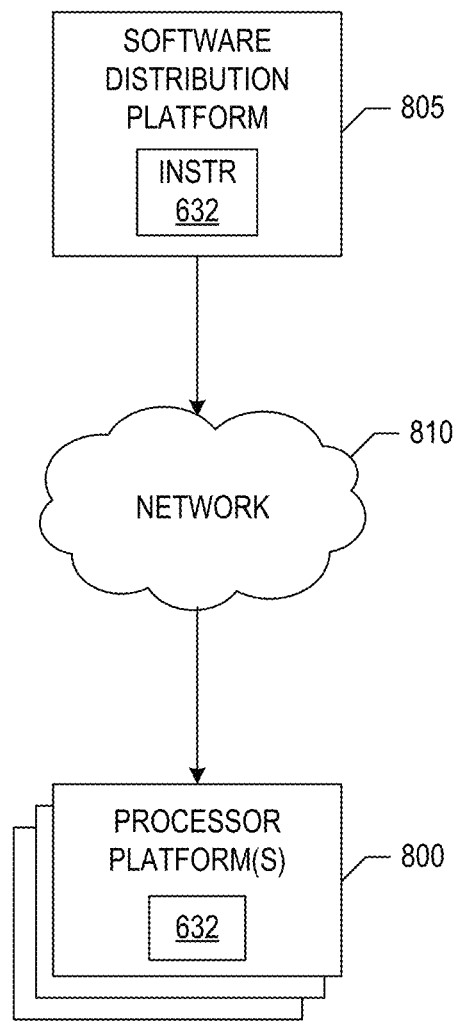
FIG. 8 is a block diagram of an example software distribution platform (e.g., one or more servers) to distribute software (e.g., software corresponding to the example machine readable instructions of FIGS. 3 and/or 4) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 805 to distribute software such as the example machine readable instructions 532 of FIG. 5 to hardware devices owned and/or operated by third parties is illustrated in FIG. 8. The example software distribution platform 805 may be implemented by any computer server, data facility, cloud service, etc., capable of storing and transmitting software to other computing devices. The third parties may be customers of the entity owning and/or operating the software distribution platform 805. For example, the entity that owns and/or operates the software distribution platform 805 may be a developer, a seller, and/or a licensor of software such as the example machine readable instructions 532 of FIG. 5. The third parties may be consumers, users, retailers, OEMs, etc., who purchase and/or license the software for use and/or re-sale and/or sub-licensing. In the illustrated example, the software distribution platform 805 includes one or more servers and one or more storage devices. The storage devices store the machine readable instructions 532, which may correspond to the example machine readable instructions 300, 400, etc. of FIGS. 3-4, as described above. The one or more servers of the example software distribution platform 805 are in communication with an example network 810, which may correspond to any one or more of the Internet and/or any of the example networks described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 532 from the software distribution platform 805. For example, the software, which may correspond to the example machine readable instructions 300, 400, etc. of FIGS. 3-4, may be downloaded to the example processor platform 500, which is to execute the machine readable instructions 532 to implement the unique elements identification circuitry 120 of FIG. 2. In some examples, one or more servers of the software distribution platform 805 periodically offer, transmit, and/or force updates to the software (e.g., the example machine readable instructions 532 of FIG. 5) to ensure improvements, patches, updates, etc., are distributed and applied to the software at the end user devices.

From the foregoing, it will be appreciated that example systems, methods, apparatus, and articles of manufacture have been disclosed that estimate cardinality through ordered statistics. Disclosed systems, methods, apparatus, and articles of manufacture improve the efficiency of using a computing device by enabling the estimation of the cardinality of very large reference datasets while using a small amount of resources (e.g., memory and storage). Disclosed systems, methods, apparatus, and articles of manufacture are accordingly directed to one or more improvement(s) in the operation of a machine such as a computer or other electronic and/or mechanical device.

Further examples and combinations thereof include the following:

Example 1 includes an apparatus to estimate cardinality through ordered statistics, comprising at least one memory, machine readable instructions, and processor circuitry to at least one of instantiate or execute the machine readable instructions to select a sample dataset from a first reference dataset of media assets, partition the sample dataset into m mutually exclusive subsets of approximately equal size, estimate a ratio of a sample weighted average and empirical cumulative distribution of an approximately largest order statistic from at least one of the m subsets, and generate an estimate of a total cardinality of the first reference dataset by multiplying the ratio by approximately m.

Example 2 includes the apparatus of example 1, wherein samples in the sample dataset are independently distributed among the reference dataset.

Example 3 includes the apparatus of example 1, wherein a base distribution of the reference dataset includes a cumulative distribution function.

Example 4 includes the apparatus of example 3, wherein to estimate the ratio includes to determine an expected value of a logarithm of the cumulative distribution function of the base distribution.

Example 5 includes the apparatus of example 3, wherein the processor circuitry to at least one of instantiate or execute the machine readable instructions to populate a plurality of registers with the m subsets, wherein ones of registers of the plurality of registers includes at least one of the m subsets.

Example 6 includes a non-transitory machine readable storage medium comprising instructions that, when executed, cause processor circuitry to at least select a sample dataset from a base distribution of a reference dataset of media assets, partition the sample dataset into m mutually exclusive subsets of approximately equal size, estimate a ratio of a sample weighted average and empirical cumulative distribution of an approximately largest order statistic from at least one of the m subsets, and generate an estimate of a total cardinality of the reference dataset by multiplying the ratio by m.

Example 7 includes the non-transitory machine readable storage medium of example 6, wherein samples in the sample dataset are independent and identically distributed among the reference dataset.

Example 8 includes the non-transitory machine readable storage medium of example 6, wherein a base distribution of the reference dataset includes a cumulative distribution function.

Example 9 includes the non-transitory machine readable storage medium of example 8, wherein to estimate the ratio includes to take an expected value of a logarithm of the cumulative distribution function of the base distribution.

Example 10 includes the non-transitory machine readable storage medium of example 8, wherein the instructions, when executed, cause processor circuitry to at least populate a plurality of registers with the m subsets, wherein each register of the plurality of registers includes one of the m subsets.

Example 11 includes an apparatus to estimate cardinality through ordered statistics, comprising at least one memory, machine readable instructions, and processor circuitry to at least one of instantiate or execute the machine readable instructions to partition a first sample dataset from a first reference dataset into a first group of m mutually exclusive first subsets of approximately equal size, partitioning a second sample dataset from a second reference dataset into a second group of m mutually exclusive second subsets of approximately equal size and partitioning a third sample dataset from a merger of the first and second sample datasets into a third group of m mutually exclusive third subsets of approximately equal size, estimate a first, second, and third ratio of weighted averages using a survival function of a first order statistic from ones of the first subsets, ones of the second subsets, and ones of the third subsets, respectively, and generate an estimated intersection cardinality of the first and second reference datasets by inclusion-exclusion of first, second, and third MinSketch estimators corresponding to the first, second, and third ratios.

Example 12 includes the apparatus of example 11, wherein the processor circuitry to at least one of instantiate or execute the machine readable instructions to select the first sample dataset from a first base distribution of a first reference dataset of media assets, and select the second sample dataset from a second base distribution of a second reference dataset of media assets.

Example 13 includes the apparatus of example 12, wherein the base distribution includes a cumulative distribution function.

Example 14 includes the apparatus of example 11, wherein the processor circuitry to at least one of instantiate or execute the machine readable instructions to calculate the first MinSketch estimator of the first subsets by a multiplication of the first ratio by approximately m, calculate the second MinSketch estimator of the second subsets by a multiplication of the second ratio by approximately m, and calculate the third MinSketch estimator of the third subsets by a multiplication of the third ratio by approximately m.

Example 15 includes the apparatus of example 11, wherein samples in the first sample dataset are independently distributed among the first reference dataset and samples in the second sample dataset are independent and identically distributed among the second reference dataset.

Example 16 includes the apparatus of example 11, wherein the processor circuitry to at least one of instantiate or execute the machine readable instructions to populate a first plurality of registers with the first subsets, wherein at least one register of the first plurality of registers includes at least one of the first subsets, populate a second plurality of registers with the second subsets, wherein each register of the second plurality of registers includes at least one of the second subsets, and populate a third plurality of registers with the third subsets, wherein each register of the third plurality of registers includes at least one of the third subsets.

Example 17 includes a non-transitory machine readable storage medium comprising instructions that, when executed, cause processor circuitry to at least partition a first sample dataset from a first reference dataset into a first group of m mutually exclusive first subsets of approximately equal size, partitioning a second sample dataset from a second reference dataset into a second group of m mutually exclusive second subsets of approximately equal size and partitioning a third sample dataset from a merger of the first and second sample datasets into a third group of m mutually exclusive third subsets of approximately equal size, estimate a first, second, and third ratio of weighted averages using a survival function of a first order statistic from ones of the first subsets, ones of the second subsets, and ones of the third subsets, respectively, and generate an estimated intersection cardinality of the first and second reference datasets by inclusion-exclusion of first, second, and third MinSketch estimators corresponding to the first, second, and third ratios.

Example 18 includes the non-transitory machine readable storage medium of example 17, wherein the instructions, when executed, cause processor circuitry to at least select the first sample dataset from a first reference dataset of media assets, and select the second sample dataset from a second reference dataset of media assets.

Example 19 includes the non-transitory machine readable storage medium of example 18, wherein a first base distribution of the first reference dataset includes a first cumulative distribution function and a second base distribution of the second reference dataset includes a second cumulative distribution function.

Example 20 includes the non-transitory machine readable storage medium of example 17, wherein the instructions, when executed, cause processor circuitry to at least calculate the first MinSketch estimator of at least the ones of the first subsets by multiplying the first ratio by approximately m, calculate the second MinSketch estimator of at least the ones of the second subsets by multiplying the second ratio by approximately m, and calculate the third MinSketch estimator of at least the ones of the third subsets by multiplying the third ratio by approximately m.

Example 21 includes the non-transitory machine readable storage medium of example 17, wherein samples in the first sample dataset are independently distributed among the first reference dataset and samples in the second sample dataset are independently distributed among the second reference dataset.

Example 22 includes the non-transitory machine readable storage medium of example 17, wherein the instructions, when executed, cause processor circuitry to at least populate a first plurality of registers with ones of the first subsets, wherein at least one register of the first plurality of registers includes at least one of the first subsets, populate a second plurality of registers with the second subsets, wherein at least one register of the second plurality of registers includes at least one of the second subsets, and populate a third plurality of registers with the third subsets, wherein at least one register of the third plurality of registers includes at least one of the third subsets. The following claims are hereby incorporated into this Detailed Description by this reference, with each claim standing on its own as a separate embodiment of the present disclosure.

What is claimed is:

1. A computing system comprising a processor, the computing system configured to perform a set of acts comprising:
    selecting a sample dataset from a reference dataset of media assets;
    partitioning the sample dataset into m mutually exclusive subsets of samples of approximately equal size, wherein m is an integer greater than three, and wherein partitioning the sample dataset comprises populating a first set of memory locations in a memory with a first subset of samples of the m subsets of samples and assigning a first register to be a working storage location for a value representing the first subset;
    estimating a ratio of a sample weighted average and empirical cumulative distribution of a largest order statistic from at least one of the m subsets; and
    generating an estimate of a total cardinality of the reference dataset by multiplying the ratio by m.

2. The computing system of claim 1, wherein samples in the sample dataset are independently distributed among the reference dataset.

3. The computing system of claim 1, wherein a base distribution of the reference dataset includes a cumulative distribution function.

4. The computing system of claim 3, wherein estimating the ratio includes determining an expected value of a logarithm of the cumulative distribution function of the base distribution.

5. A non-transitory machine readable storage medium comprising instructions that, when executed, cause a computing system to at least:
- select a sample dataset from a reference dataset of media assets;
- partition the sample dataset into m mutually exclusive subsets of samples of approximately equal size, wherein m is an integer greater than three, and wherein partitioning the sample dataset comprises populating a first set of memory locations in a memory with a first subset of samples of the m subsets of samples and assigning a first register to be a working storage location for a value representing the first subset;
- estimate a ratio of a sample weighted average and empirical cumulative distribution of a largest order statistic from at least one of the m subsets; and
- generate an estimate of a total cardinality of the reference dataset by multiplying the ratio by m.

6. The non-transitory machine readable storage medium of claim 5, wherein samples in the sample dataset are independent and identically distributed among the reference dataset.

7. The non-transitory machine readable storage medium of claim 5, wherein a base distribution of the reference dataset includes a cumulative distribution function.

8. The non-transitory machine readable storage medium of claim 7, wherein to estimate the ratio includes to take an expected value of a logarithm of the cumulative distribution function of the base distribution.

9. A method comprising:
- selecting a sample dataset from a reference dataset of media assets;
- partitioning the sample dataset into m mutually exclusive subsets of samples of approximately equal size, wherein m is an integer greater than three, and wherein partitioning the sample dataset comprises populating, by a computing system, a first set of memory locations in a memory with a first subset of samples of the m subsets of samples and assigning a first register to be a working storage location for a value representing the first subset;
- estimating a ratio of a sample weighted average and empirical cumulative distribution of a largest order statistic from at least one of the m subsets; and
- generating an estimate of a total cardinality of the reference dataset by multiplying the ratio by m.

10. The method of claim 9, wherein samples in the sample dataset are independently distributed among the reference dataset.

11. The method of claim 9, wherein a base distribution of the reference dataset includes a cumulative distribution function.

12. The method of claim 11, wherein estimating the ratio includes determining an expected value of a logarithm of the cumulative distribution function of the base distribution.

* * * * *